(12) United States Patent
Kurciska et al.

(10) Patent No.: US 8,452,771 B2
(45) Date of Patent: May 28, 2013

(54) METHOD FOR DIFFERENTIATING TRAFFIC DATA OBTAINED FROM PROBE VEHICLES

(75) Inventors: Maja Kurciska, Sherman Oaks, CA (US); Pedram Vaghefinazari, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 12/983,357

(22) Filed: Jan. 3, 2011

(65) Prior Publication Data

US 2012/0173530 A1 Jul. 5, 2012

(51) Int. Cl.
*G06F 17/30* (2006.01)

(52) U.S. Cl.
USPC ............................... 707/737; 701/423

(58) Field of Classification Search
CPC .................................................. G01C 21/3691
USPC ................................ 707/738, 737; 701/423
See application file for complete search history.

(56) References Cited

U.S. PATENT DOCUMENTS

| | | | |
|---|---|---|---|
| 5,842,146 A | 11/1998 | Shishido | |
| 6,295,503 B1 | 9/2001 | Inoue et al. | |
| 6,353,788 B1 | 3/2002 | Baker et al. | |
| 6,381,533 B1 | 4/2002 | Crane et al. | |
| 6,385,539 B1 | 5/2002 | Wilson et al. | |
| 6,556,916 B2 | 4/2003 | Waite et al. | |
| 6,560,532 B2 | 5/2003 | Cayford | |
| 6,591,253 B1 | 7/2003 | Dinkin et al. | |
| 6,594,576 B2 | 7/2003 | Fan et al. | |
| 6,804,604 B2 | 10/2004 | Yamazaki | |
| 6,862,500 B2 | 3/2005 | Tzamaloukas | |
| 6,862,524 B1 | 3/2005 | Nagda et al. | |
| RE38,724 E | 4/2005 | Peterson | |
| 6,925,378 B2 | 8/2005 | Tzamaloukas | |
| 7,072,764 B2 | 7/2006 | Donath et al. | |
| 7,076,365 B2 | 7/2006 | Tzamaloukas | |
| 7,096,115 B1 | 8/2006 | Groth et al. | |
| 7,124,023 B2 | 10/2006 | Peeters | |
| 7,139,659 B2 | 11/2006 | Mbekeani et al. | |
| 7,188,026 B2 | 3/2007 | Tzamaloukas | |
| 7,194,356 B2 | 3/2007 | Sano | |
| 7,222,018 B2 | 5/2007 | Uyeki et al. | |
| 7,228,224 B1 | 6/2007 | Rosen et al. | |
| 7,269,507 B2 | 9/2007 | Cayford | |
| 7,289,904 B2 | 10/2007 | Uyeki | |
| 7,319,931 B2 | 1/2008 | Uyeki et al. | |
| 7,366,606 B2 | 4/2008 | Uyeki | |
| 7,392,130 B1 | 6/2008 | Rosen et al. | |
| 7,451,042 B2 | 11/2008 | Uyeki et al. | |
| 7,471,212 B2 | 12/2008 | Krautter et al. | |
| 7,477,988 B2 | 1/2009 | Dorum | |
| 7,558,695 B2 | 7/2009 | Calderone et al. | |
| 7,576,661 B2 | 8/2009 | Mochizuki | |
| 7,593,809 B2 | 9/2009 | Rosen et al. | |

(Continued)

OTHER PUBLICATIONS

International Search Report and Written Opinion mailed Apr. 27, 2012 in PCT Application No. PCT/US2011/067575.

*Primary Examiner* — Jorge A Casanova
(74) *Attorney, Agent, or Firm* — Plumsea Law Group, LLC

(57) ABSTRACT

A remote server receives traffic data from a plurality of probe vehicles traveling on roadways. The remote server stores the received traffic data in a regular lane database and/or a carpool lane database. The remote server differentiates the received traffic data for storage in the appropriate database based on the number of probe vehicles associated with each speed pattern observed within the received traffic data.

23 Claims, 12 Drawing Sheets

U.S. PATENT DOCUMENTS

| | | |
|---|---|---|
| 2004/0246147 A1 | 12/2004 | von Grabe |
| 2005/0055158 A1 | 3/2005 | Machino |
| 2005/0222760 A1 | 10/2005 | Cabral et al. |
| 2005/0261827 A1 | 11/2005 | Furukawa |
| 2005/0267677 A1 | 12/2005 | Poykko et al. |
| 2005/0288855 A1 | 12/2005 | Sano |
| 2007/0005228 A1 | 1/2007 | Sutardja |
| 2007/0050134 A1 | 3/2007 | Hayashida et al. |
| 2007/0088490 A1 | 4/2007 | Sutardja |
| 2007/0100537 A1 | 5/2007 | Parikh et al. |
| 2007/0197217 A1 | 8/2007 | Sutardja |
| 2007/0208495 A1 | 9/2007 | Chapman et al. |
| 2007/0208501 A1 * | 9/2007 | Downs et al. .................. 701/119 |
| 2008/0071465 A1 | 3/2008 | Chapman et al. |
| 2008/0177459 A1 | 7/2008 | Sutardja |
| 2008/0177467 A1 | 7/2008 | Sutardja |
| 2008/0177470 A1 | 7/2008 | Sutardja |
| 2008/0195428 A1 | 8/2008 | O'Sullivan |
| 2008/0300776 A1 | 12/2008 | Petrisor et al. |
| 2009/0018761 A1 | 1/2009 | Petrisor |
| 2009/0295922 A1 | 12/2009 | Mori |
| 2010/0069035 A1 | 3/2010 | Johnson |
| 2010/0280751 A1 | 11/2010 | Breed |
| 2010/0292916 A1 | 11/2010 | Kurciska et al. |
| 2010/0312527 A1 | 12/2010 | Weiland et al. |

* cited by examiner

METHOD FOR DIFFERENTIATING TRAFFIC DATA OBTAINED FROM PROBE VEHICLES

BACKGROUND

The present disclosure relates to a method for storing traffic data in a database for use by a navigation system. In particular, it relates to a method of differentiating traffic data obtained by navigation systems in probe vehicles for storage at a remote server in a carpool lanes database and a regular lanes database.

Navigation systems are well known in the industry. Navigation systems typically calculate a route from the location of the system to a desired location input by a user. Many navigation systems use a traffic database to determine travel times and traffic incidents along a route. The navigation system may calculate a route based on the data contained in the traffic database, and the navigation system directs the user via that route.

Typically, a traffic database associates individual segments of a route with travel times and other traffic incident data collected from multiple probe vehicles traveling along that route. The traffic database may be stored in a database for use by a navigation system in calculating a route to a desired location.

In many areas of the country, carpool lanes form an integral part of the transportation system. In the Los Angeles area, for example, almost every major interstate route includes at least one carpool lane (often called an HOV or High Occupancy Vehicle lane). In the Washington, D.C. metro area, there are entire stretches of interstates that become HOV lanes at certain times of the day. In addition, in Washington, D.C. and Houston, the HOV lanes are accessible only at certain times of the day and are shared, such that they are open to traffic in one direction during certain hours and to traffic in another direction during other hours. In some cases, however, the use of the HOV lanes may be undesirable. For example, in Houston and Washington, D.C., the HOV lanes are separated from other lanes of traffic. Accordingly, if an accident occurs in an HOV lane, it may be impossible to bypass the accident and the HOV lane may be much slower. It is desirable to calculate alternate travel times for a user considering various routes that do and do not use the HOV lanes.

Accordingly, there is a need in the art for a traffic database that differentiates between traffic data collected for regular lanes and traffic data collected for carpool lanes.

SUMMARY

A method for differentiating traffic data obtained from probe vehicles is disclosed. In one aspect, the invention provides a method for storing probe data gathered by a navigation system at a remote server, comprising: receiving data from a plurality of probe vehicles at the remote server; determining at least two speed patterns associated with the received data; classifying the received data from each of the plurality of probe vehicles according to one of a first speed pattern and a second speed pattern; calculating a number of probe vehicles associated with each of the first speed pattern and the second speed pattern; storing the data classified as the first speed pattern in a regular lanes database; storing the data classified as the second speed pattern in a carpool lanes database; and wherein the data is classified as the first speed pattern if the number of probe vehicles associated with the first speed pattern is greater than the number of probe vehicles associated with the second speed pattern.

In another aspect, the invention provides a method for differentiation of collected probe data from a navigation system at a remote server in communication with a regular lanes database and a carpool lanes database, comprising: receiving probe data from a plurality of vehicles at the remote server; fitting the received probe data to one of a first speed pattern and a second speed pattern; determining a first number of vehicles associated with the received probe data fitting the first speed pattern; determining a second number of vehicles associated with the received probe data fitting the second speed pattern; wherein the received probe data associated with the smaller of the first number and the second number is stored in the carpool lanes database; and wherein the remaining received probe data is stored in the regular lanes database.

In another aspect, the invention provides a method for sorting traffic data from a plurality of vehicles with a navigation system at a remote server; comprising: receiving traffic data from a plurality of vehicles at the remote server; determining whether the received traffic data corresponds to at least two speed patterns; comparing a first number of vehicles associated with a first speed pattern with a second number of vehicles associated with a second speed pattern; storing a first portion of the received traffic data associated with the larger of the first number of vehicles and the second number of vehicles in a regular lanes database; and storing a second portion of the received traffic data associated with the smaller of the first number of vehicles and the second number of vehicles in a carpool lanes database.

In another aspect, the invention provides a method for differentiation of collected probe data from a navigation system at a remote server in communication with a regular lanes database and a carpool lanes database, comprising: receiving probe data from a plurality of vehicles at the remote server; calculating a first probability for a first one of the plurality of vehicles being associated with a carpool lane; wherein the first probability is calculated based on a first condition; calculating a second probability for the first one of the plurality of vehicles being associated with the carpool lane; wherein the second probability is calculated based on a second condition; determining whether the first one of the plurality of vehicles is associated with the carpool lane or a regular lane based on the first probability and the second probability; wherein the received probe data associated with the first one of the plurality of vehicles is stored in the carpool lanes database if the first one of the plurality of vehicles is determined to be associated with the carpool lane; and wherein the received probe data associated with the first one of the plurality of vehicles is stored in the regular lanes database if the first one of the plurality of vehicles is determined to be associated with the regular lane.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

Figure 1:
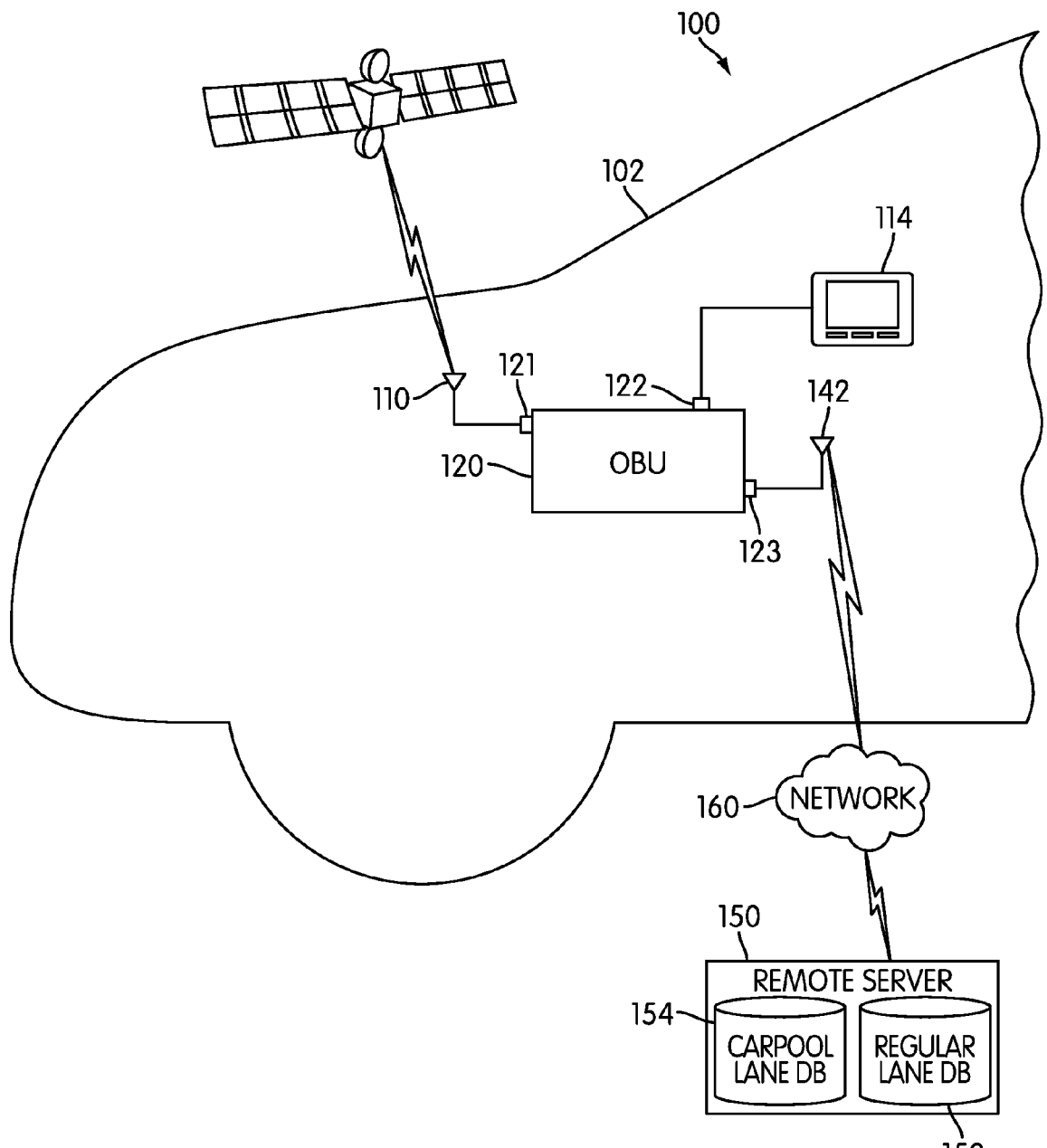
FIG. 1 is a schematic view of an embodiment of a navigation system associated with a motor vehicle.

FIG. 1 is a schematic view of an embodiment of navigation system 100 that is configured to be used with motor vehicle 102. For purposes of clarity, only some components of a motor vehicle that may be relevant to navigation system 100 are illustrated. Furthermore, in other embodiments, additional components may be added or removed.

Navigation system 100 may be any system capable of providing navigational information to a user. The term "navigation information" refers to any information that may be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information may also include commercial information including business and restaurant names, commercial districts, shopping centers, and parking facilities. Navigation information may also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information may include one item of information, as well as a combination of several items of information.

Generally, any navigation system known in the art may be used. One example of a navigation system is disclosed in U.S. Patent Application Publication Number 2005/0261827, to Furukawa, and filed on May 19, 2004, the entirety of which is hereby disclosed by reference. Another example of a navigation system is disclosed in U.S. Pat. No. 5,842,146, to Shishido, and filed on May 10, 1996, the entirety of which is hereby disclosed by reference.

Navigation system 100 may include provisions for receiving GPS information. In some cases, navigation system 100 may include GPS receiver 110. For purposes of clarity, GPS receiver 110 is illustrated in the form of a GPS antenna in the current embodiment. However, it will be understood that GPS receiver 110 may be associated with both an antenna and a separate receiving device in some embodiments. In an exemplary embodiment, GPS receiver 110 may be used for gathering a current location for motor vehicle 102. With this arrangement, navigation system 100 may be configured to automatically determine a beginning point for a particular route as well as for tracking the position of motor vehicle 102 along the route.

Navigation system 100 may include provisions for communicating with a driver. In some embodiments, navigation system 100 may include navigation interface 114. In some cases, navigation interface 114 may include provisions for transmitting information to a driver and/or passenger. For example, navigation interface 114 may include a display screen that displays maps including vehicle location and route information. In other cases, navigation interface 114 may include provisions for receiving information from a driver and/or passenger. For example, navigation interface 114 may include buttons that allow a driver to input destinations for determining routes. In some cases, the buttons may be push-type buttons disposed adjacent to a display screen. In other cases, the display screen may be a touch-screen display capable of receiving user input. In an exemplary embodiment, navigation interface 114 may include provisions for transmitting and receiving information from a driver and/or passenger.

Motor vehicle 102 may include provisions for communicating with, and in some cases controlling, the various components associated with navigation system 100. In some embodiments, navigation system 100 may be associated with a computer or similar device. In the current embodiment, navigation system 100 may include onboard unit 120, hereby referred to as OBU 120. In one embodiment, OBU 120 may be configured to communicate with, and/or control, various components of navigation system 100. In addition, in some embodiments, OBU 120 may be configured to control additional components of a motor vehicle that are not shown.

OBU 120 may include a number of ports that facilitate the input and output of information and power. The term "port" as used throughout this detailed description and in the claims refers to any interface or shared boundary between two conductors. In some cases, ports may facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with OBU 120 are optional. Some embodiments may include a given port or provision, while others may exclude it. The following description discloses many of the possible ports and provisions that may be used, however, it should be kept in mind that not every port or provision must be used or included in a given embodiment.

In some embodiments, OBU 120 may include first port 121 for communicating with GPS receiver 110. In particular, OBU 120 may be configured to receive GPS information from GPS receiver 110. Also, OBU 120 may include second port 122 for communicating with navigation interface 114. In particular, OBU 120 may be configured to transmit information to navigation interface 114, as well as to receive information from navigation interface 114.

In some embodiments, a navigation system may be associated with remote server 150. The term "remote server" as used throughout this detailed description and in the claims refers to any computing resource that is disposed outside of motor vehicle 102 that is capable of providing resources to motor vehicle 102. In some cases, remote server 150 may be a collection of networked computers or computer servers. Remote server 150 may be used to receive, process, and/or store information of any kind. In one embodiment, remote server 150 may be configured to collect information related to traffic on roadways, process the information and store the information for later use. In addition, remote server 150 may be configured to calculate routes for navigation system 100 as disclosed in copending and commonly owned U.S. patent application Ser. No. 12/465,308, entitled "Navigation System for a Motor Vehicle", filed on May 13, 2009, and published as U.S. Patent Application Publication 2010/0292916 on Nov. 18, 2012, which application is incorporated herein by reference in its entirety.

A remote server may be provided with various provisions for storing information. In embodiments where a remote server may be used to collect information related to traffic on roadways, the remote server may include one or more databases for storing traffic information. Furthermore, in embodiments where routes include both carpool lanes and regular lanes, or non-carpool lanes, a remote server may include separate databases for storing traffic information associated with each type of lane. The term "carpool lane" as used throughout this detailed description and in the claims refers to any lane associated with an occupancy requirement of two or more. In other words, any lane that requires a motor vehicle to have two or more occupants to be used. In some areas, carpool lanes are referred to as high occupancy vehicle lanes, or HOV lanes. In addition, it will be understood that in some cases, a lane may have an occupancy requirement of two or more during some times of day, such as rush hour, and may not have an occupancy requirement during other times of day. Further, in some cases, carpool lanes may have a greater occupancy requirement than two, such as "HOV 3" lanes. In other cases, carpool lanes may also permit vehicles without regard to an occupancy requirement, such as specified classes of exempt vehicles, including, but not limited to: motorcycles, hybrid vehicles, low-emission vehicles, alternate fuel vehicles, and other types of vehicles that may be permitted to travel in carpool lanes.

In this embodiment, remote server 150 may be provided with regular lane database 152. In addition, remote server 150 may be provided with carpool lane database 154. With this arrangement, traffic information related to regular lanes may be stored within regular lane database 152 and traffic information related to carpool lanes may be stored within carpool lane database 154. Furthermore, when calculating travel time over carpool lanes, remote server 150 may access carpool lane database 154. Likewise, when calculating travel time over regular lanes, remote server may access regular lane database 152.

A navigation system may include provisions for communicating with a remote server. In one embodiment, navigation system 100 may communicate with remote server 150 using network 160. Generally, network 160 may be any type of network. In some cases, network 160 may be a vehicle communication network that uses motor vehicles for at least some nodes of the network. In addition, a vehicle communication network may include roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m. In other embodiments, navigation system 100 may be configured to communicate with remote server 150 using any other type of wireless network, including, but not limited to: WiFi networks, cell phone networks, as well as any other type of network. Furthermore, network 160 may be associated with any type of network standard including, but not limited to: CDMA, TDMA, GSM, AMPS, PCS, analog and/or W-CDMA.

In some embodiments, OBU 120 may include third port 123 that is configured to communicate with a network antenna. In an exemplary embodiment, third port 123 may be associated with network antenna 142 that is configured to exchange information with remote server 150 using network 160.

Navigation system 100 may include provisions for communicating with one or more components of a motor vehicle that are not associated directly with navigation system 100. In some cases, OBU 120 may include additional ports for communicating directly with one or more additional devices of a motor vehicle, including various sensors or systems of the motor vehicle.

Figure 2:
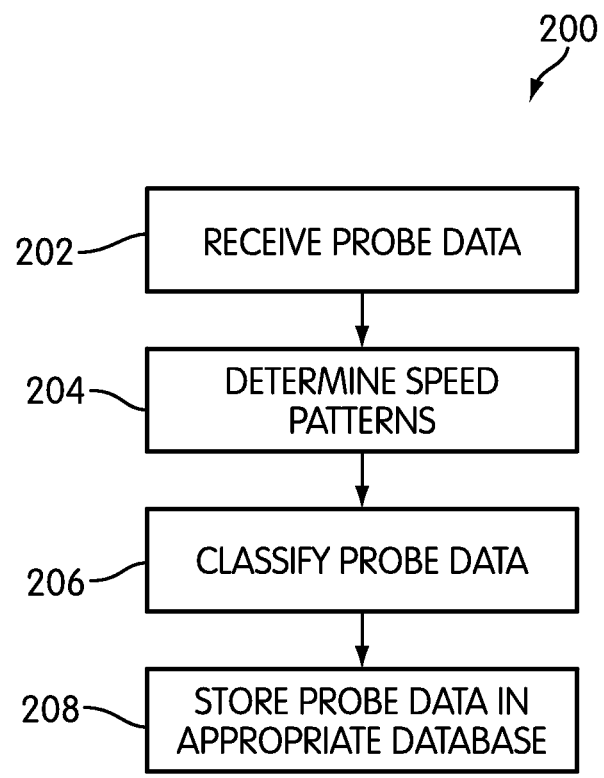
FIG. 2 is a schematic view of an exemplary embodiment of a method for storing probe data by a navigation system.

FIG. 2 illustrates an exemplary embodiment of a method for storing probe data gathered by a navigation system. In some embodiments, remote server 150 may be configured to perform the method of storing probe data 200. The order of the steps illustrated in FIG. 2 is exemplary and not required. In this embodiment, one or more motor vehicles may act as probes, each including a navigation system that gathers probe data associated with each motor vehicle's driving activity, including, but not limited to: travel times for a roadway or road link, speed, distance, location and/or type of carpool lanes, and other relevant traffic information. At step 202, remote server 150 may receive the probe data from the plurality of motor vehicles. At step 204, remote server 150 may determine whether the received probe data from the plurality of motor vehicles is associated with any speed patterns, as more fully discussed below. At step 206, remote server 150 may classify the received probe data as fitting one or more of the speed patterns. Finally, at step 208, remote server 150 may store the probe data from each individual motor vehicle in the appropriate database that corresponds to the determined speed pattern.

Figure 3:
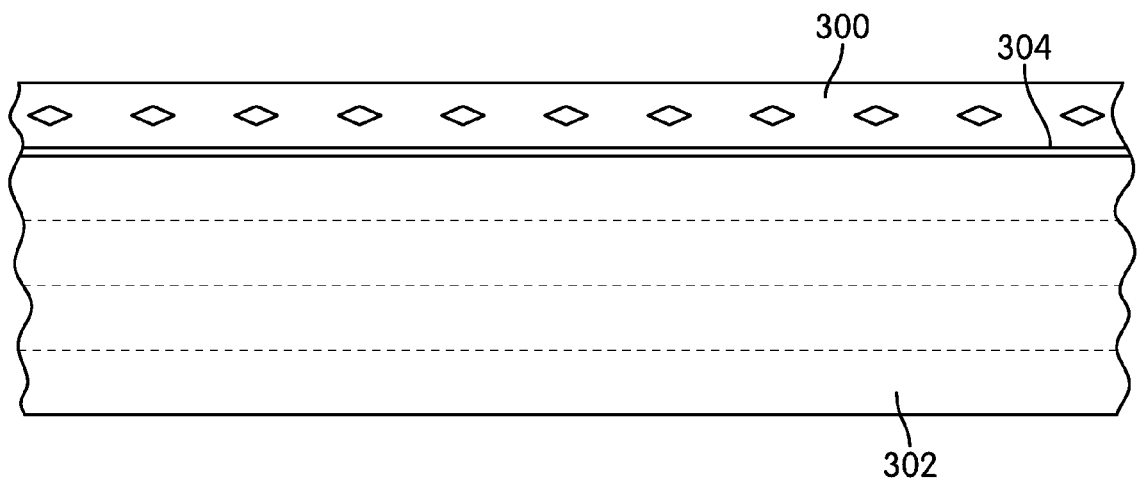
FIG. 3 is an illustration of a HOV lane along a route.
Figure 4:
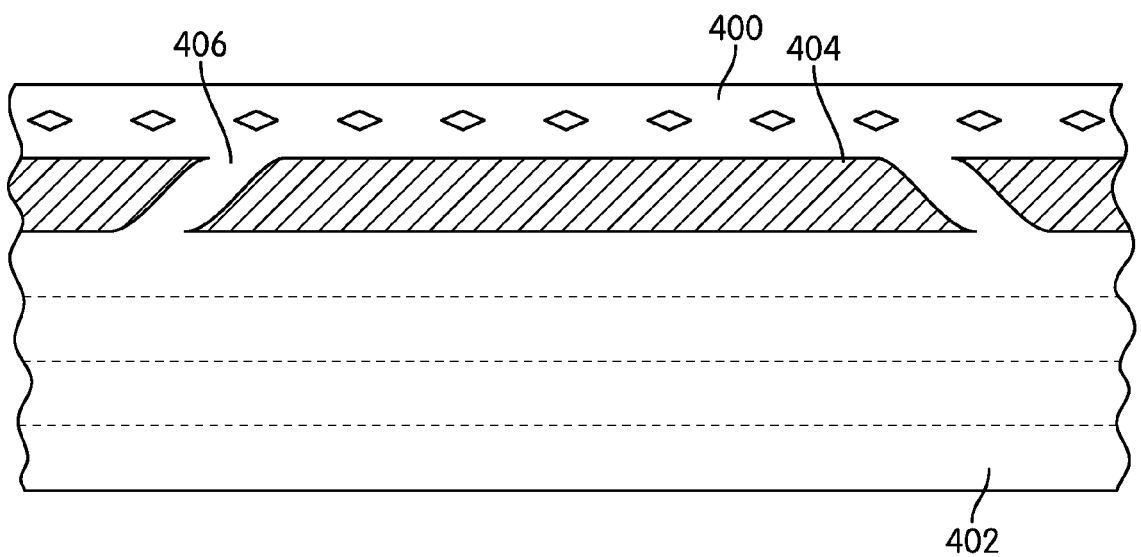
FIG. 4 is an illustration of an exclusive HOV lane along a route.

FIGS. 3 and 4 illustrate two alternate embodiments of carpool or HOV lanes that may be traveled by a motor vehicle. For the purposes of illustration, a single carpool lane is illustrated in the Figures. However, it should be understood that one or more lanes may be designated as a carpool lane. As shown in FIG. 3, carpool lane 300 may be a designated lane of a multi-lane roadway. In this embodiment, carpool lane 300 is visually separated from regular lanes 302 by a lane marking 304. In some embodiments, lane marking 304 may be a solid white line or other indicia on the roadway that distinguishes carpool lane 300 from regular lanes 304. In some cases, carpool lane 300 may include diamond-shaped markings or other commonly used indicia for designating carpool or HOV lane status.

FIG. 4 illustrates an embodiment of an exclusive carpool lane 400. In this embodiment, exclusive carpool lane 400 is physically separated from regular lanes 402 of a multi-lane roadway by a barrier 404. In some cases, exclusive carpool lane 400 may include diamond-shaped markings or other commonly used indicia for designating carpool or HOV lane status. In some embodiments, barrier 404 may include an entrance/exit 406 to allow motor vehicles to enter/exit between regular lanes 402 and exclusive carpool lane 400. In other embodiments, barrier 404 may include other mechanisms for separating exclusive carpool lane 400 and regular lanes 402, including, but not limited to: movable barricades, gates, and signals.

Figure 5:
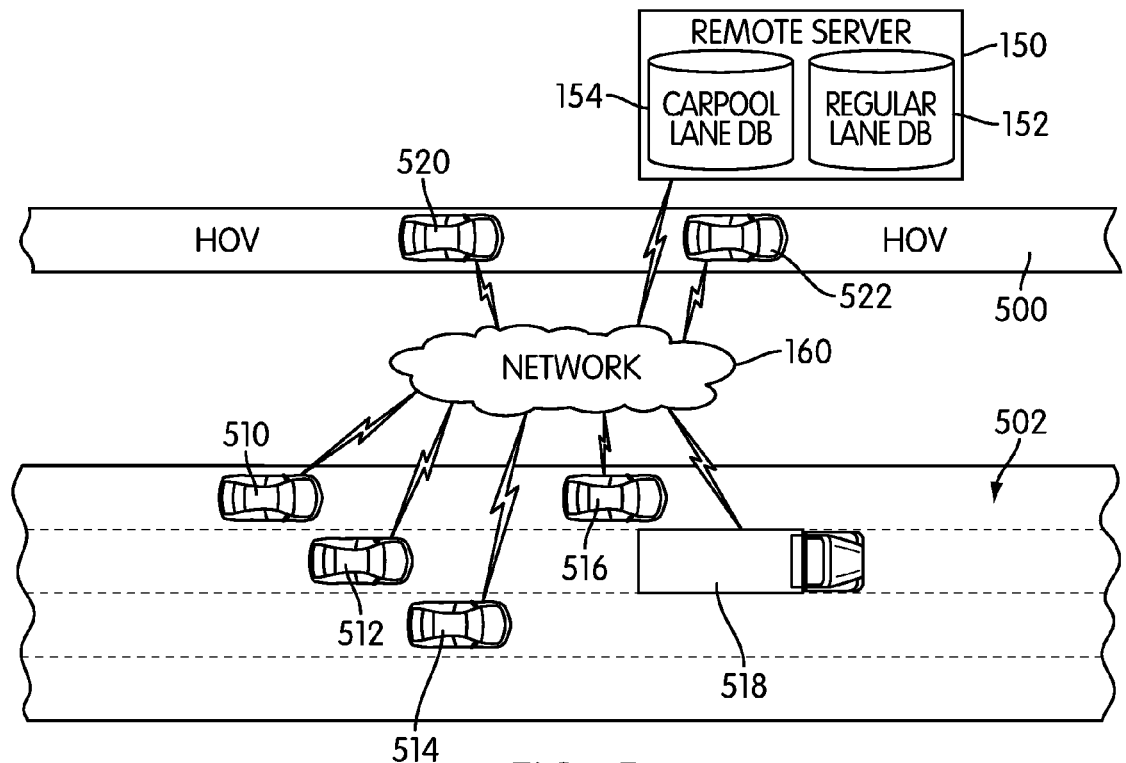
FIG. 5 is a schematic view of an exemplary embodiment of a method of obtaining traffic data from probe vehicles.
Figure 6:
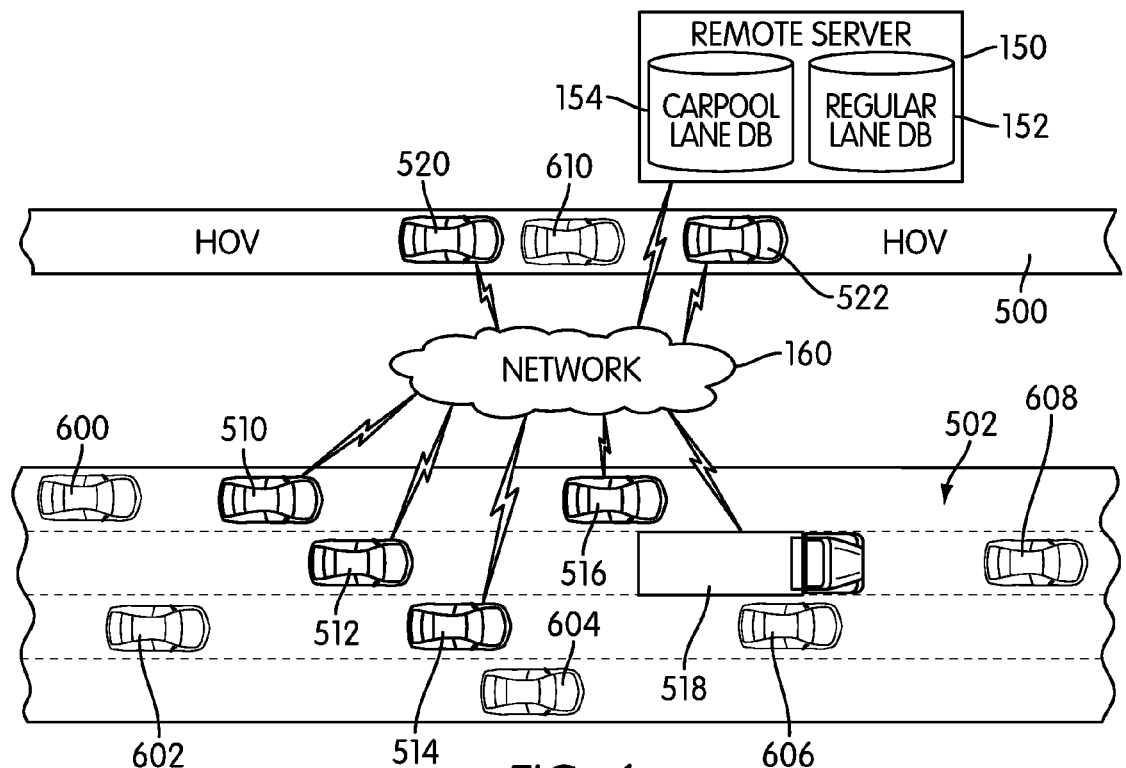
FIG. 6 is a schematic view of an exemplary embodiment of a method of collecting real-time traffic information.

FIGS. 5 and 6 illustrate schematic views of embodiments of methods of obtaining probe data from probe vehicles for a remote server. It should be understood that the methods illustrated here are only intended to be exemplary, and other embodiments may use any other provisions for gathering probe data related to one or more roadways.

Referring to FIG. 5, remote server 150 may receive information from a plurality of motor vehicles using network 160. In some embodiments, a probe vehicle may include a motor vehicle equipped with a navigation system that gathers probe data associated with each motor vehicle's driving activity, including, but not limited to: travel times for a roadway or road link, speed, distance, location and/or type of carpool lanes, and other relevant traffic information. In this embodiment, a plurality of probe vehicles travel along a roadway, including a carpool lane 500 and regular lanes 502. The plurality of probe vehicles may include a first probe vehicle 510, a second probe vehicle 512, a third probe vehicle 514, a fourth probe vehicle 516, and a fifth probe vehicle 518 traveling in regular lanes 502. In this embodiment, a sixth probe vehicle 520 and a seventh probe vehicle 522 travel in carpool lane 500. In some embodiments, carpool lane 500 may be an exclusive carpool lane. In other embodiments, carpool lane 500 may be a designated lane of a multi-lane roadway.

As each probe vehicle travels along the roadway, the probe data, including travel times of each probe vehicle along a current route, may be sent to remote server 150 and stored as real-time traffic information. By combining information received from a plurality of probe vehicles on a given route, remote server 150 may determine real-time traffic information. For example, remote server 150 may determine routes with heavy congestion by comparing current average traveling times of a plurality of probe vehicles with known travel times for the route during non-congested conditions.

In some embodiments, remote server 150 may sort the received probe data and store the probe data in one or more databases, including regular lane database 152 and/or carpool lane database 154. In some embodiments, probe data may include traffic data or travel times. In other embodiments, probe data may include data associated with one or more links of the roadway, including information concerning the presence of carpool lanes. In this embodiment, using information received from first probe vehicle 510, second probe vehicle 512, third probe vehicle 514, fourth probe vehicle 516, and fifth probe vehicle 518, remote server 150 may determine information associated with regular lanes 502. In some cases, information received from first probe vehicle 510, second probe vehicle 512, third probe vehicle 514, fourth probe vehicle 516, and fifth probe vehicle 518 may be stored within regular lane database 152. In some cases, this information may then be used by remote server 150 in calculating more accurate travel times for routes using regular lanes 502 of the roadway. In other cases, this information may be used by remote server 150 to update other databases, including a map database.

Likewise, using information received from sixth probe vehicle 520 and seventh probe vehicle 522, remote server 150 may determine information associated with carpool lane 500. In some cases, information received from sixth probe vehicle 520 and seventh probe vehicle 522 may be stored within carpool lane database 154. In some cases, this information may be used for calculating more accurate traveling times for routes using carpool lane 500. In other cases, this information may be used by remote server 150 to update other databases, including a map database.

Referring to FIG. 6, in this exemplary embodiment, remote server 150 may be configured to receive traffic information from a plurality of probe vehicles. In some embodiments, one or more probe vehicles may be sent out to travel various routes in order to determine real-time traffic information. For example, in cities with major highways or "beltways," several probe vehicles may be configured to travel along parts of the highways or beltways to determine real-time traffic conditions. In some cases, the traffic conditions may be calculated using a GPS-based navigation system. In other cases, the operators of the probe vehicles may send back reports about the observed traffic patterns. These reports may then be used to estimate parameters to be stored in a traffic database.

In this embodiment, remote server 150 is configured to receive traffic information from first probe vehicle 510, second probe vehicle 512, third probe vehicle 514, fourth probe vehicle 516, and fifth probe vehicle 518 traveling in regular lanes 502. Regular lanes 502 also may include one or more non-probe vehicles that do not communicate with network 160, including first vehicle 600, second vehicle 602, third vehicle 604, fourth vehicle 606, and fifth vehicle 608. In this embodiment, remote server 150 is also configured to receive traffic information from sixth probe vehicle 520 and seventh probe vehicle 522 traveling in carpool lane 500. Carpool lane 500 also may include one or more non-probe vehicles that do not communicate with network 160, including sixth vehicle 610.

Using traffic information received from one or more of first probe vehicle 510, second probe vehicle 512, third probe vehicle 514, fourth probe vehicle 516, and fifth probe vehicle 518, remote server 150 may determine traffic information for regular lanes 502. Likewise, using traffic information received from one or more of sixth probe vehicle 520 and seventh probe vehicle 522, remote server 150 may determine traffic information for carpool lane 500. In some embodiments, remote server 150 may sort the received traffic information for storage in the appropriate traffic database, including regular lanes database 152 and carpool lane database 154. In some cases, regular lanes database 152 and/or carpool lane database 154 may be used for calculating more accurate travel times for various routes by incorporating real-time traffic information.

Figure 7:
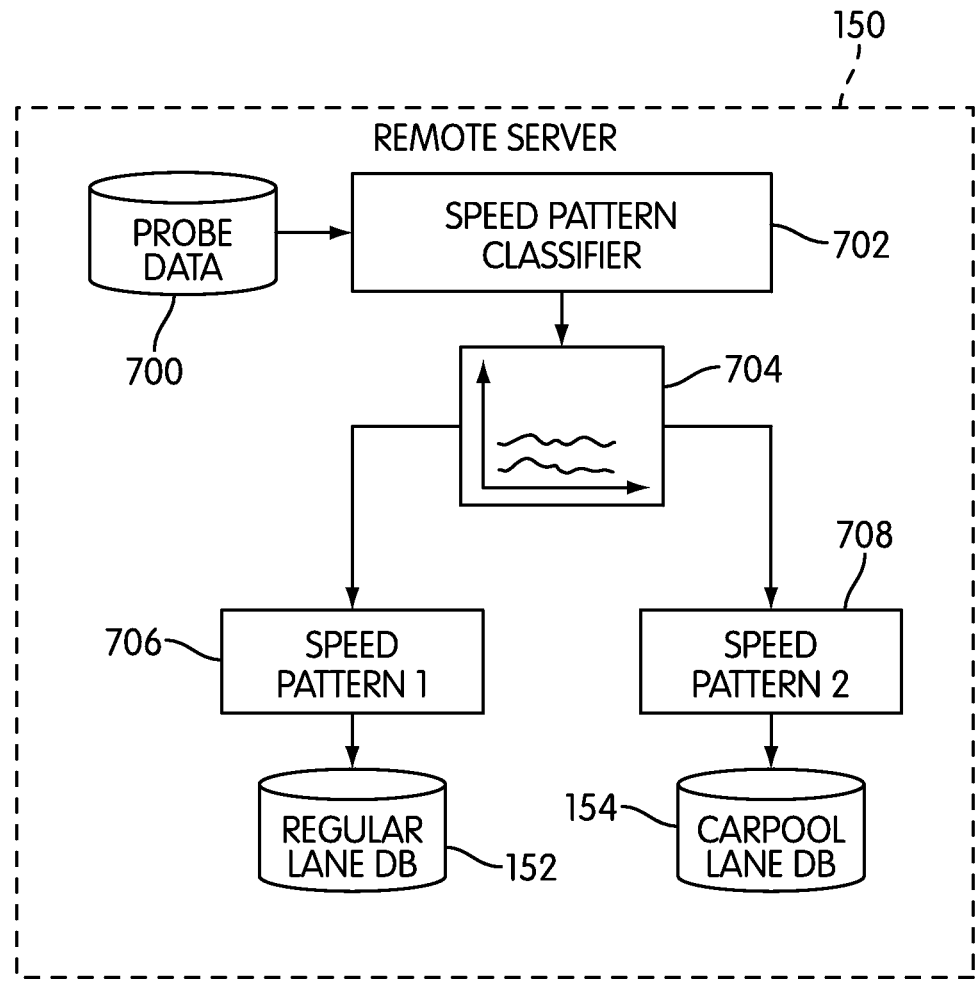
FIG. 7 is a schematic view of an exemplary embodiment of a remote server including a speed pattern classifier.

FIG. 7 illustrates an exemplary embodiment of a remote server. In one embodiment, remote server 150 may collect and sort probe data 700 gathered by one or more probe vehicles. In some embodiments, probe data 700 includes traffic data from a plurality of probe vehicles. In some cases, probe data 700 may be traffic data gathered by one or more probe vehicles traveling in carpool lanes and/or regular lanes on a roadway. In other cases, probe data may be traffic data gathered by one or more probe vehicles traveling exclusively in a carpool lane or a regular lane on a roadway. In some embodiments, probe data 700 may be sorted using a speed pattern classifier 702. In some cases, speed pattern classifier may be implemented in hardware and/or software modules within remote server 150. In other cases, speed pattern classifier 702 may be implemented in hardware and/or software in communication with remote server 150.

In some embodiments, speed pattern classifier 702 may be used by remote server 150 to sort probe data 700 for storage between regular lane database 152 and carpool lane database 154. In this embodiment, speed pattern classifier 702 fits probe data 700 according to one or more speed patterns 704. Speed patterns 704 may be generated by associating the speed of probe vehicles over a set time interval. In some embodiments, the time interval used for determining whether probe data 700 fits one or more speed patterns 704 may be fixed. In other embodiments, the time interval may be variable. In some cases, the time interval may be varied depending on time of day and/or day of week, including, for example, a shorter time interval may be used during times and/or days typically associated with rush hour and/or a longer time interval may be used during other times and/or days.

In another embodiment, speed patterns 704 may include an average speed value associated with a particular roadway, road link, and/or travel lane. In some cases, an average speed value may be determined based on the individual speeds of probe vehicles traveling on the roadway, road link, and/or travel lane at a particular time. In other cases, the average speed value may be determined over a longer time interval, as discussed above. In an exemplary embodiment, speed patterns 704 may be generated by determining average speed values associated with each roadway, road link, and/or travel lane based on individual speeds of probe vehicles at a particular time. In some cases, the average speed values for each roadway, road link, and/or travel lane may be used to fit probe data 700 for storage between regular lane database 152 and carpool lane database 154.

In some embodiments, speed pattern classifier 702 may classify probe data according to first speed pattern 706 and/or a second speed pattern 708. In some cases, probe data 700 may be classified based on a fit with one or more speed patterns 704. In different embodiments, one or more known standard statistical analysis techniques may be used to fit probe data 700 to one or more speed patterns 704. In other cases, probe data 700 may be classified based on a comparison with a real-time and/or historical traffic database.

Referring again to FIG. 7, in this embodiment, speed pattern classifier 702 may classify a first set of probe data 700 according to first speed pattern 706. Similarly, speed pattern classifier 702 may classify a second set of probe data 700 according to second speed pattern 708. In some embodiments, first speed pattern 706 may correspond to traffic data gathered by probe vehicles traveling along one or more regular lanes of a roadway. Similarly, second speed pattern 708 may correspond to traffic data gathered by probe vehicles traveling along a carpool lane of a roadway. In this embodiment, the first set of probe data 700 associated with first speed pattern 706 may be stored in regular lane database 152. Likewise, the second set of probe data 700 associated with second speed pattern 708 may be stored in carpool lane database 154.

Figure 8:
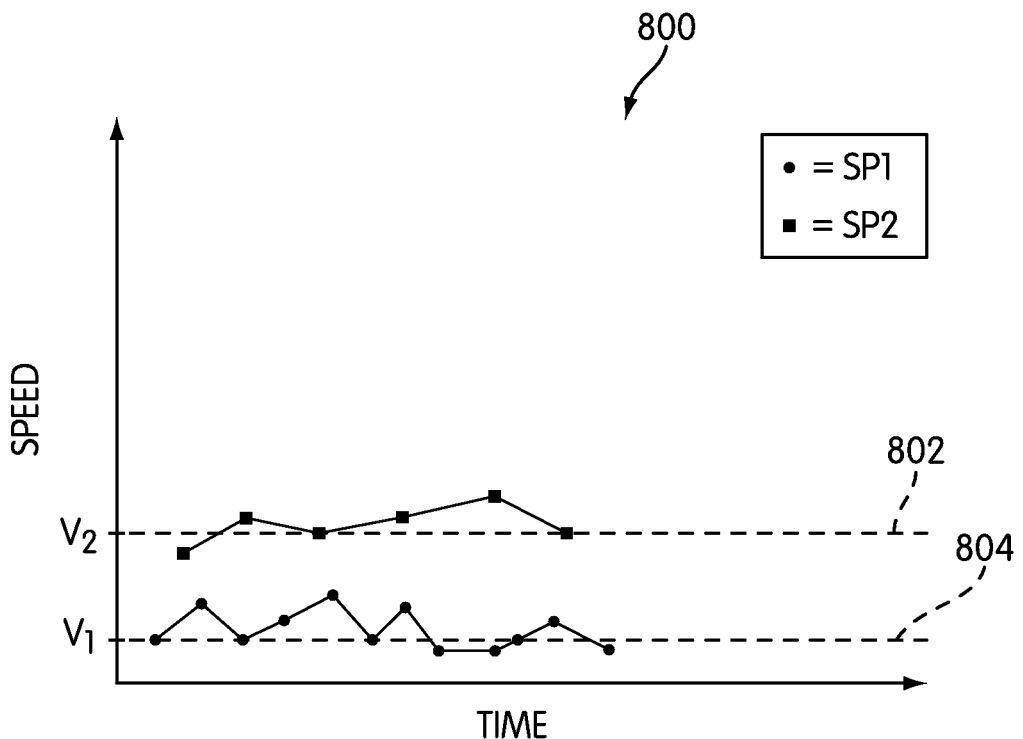
FIG. 8 is an illustration depicting speed patterns of collected probe data.
Figure 9:
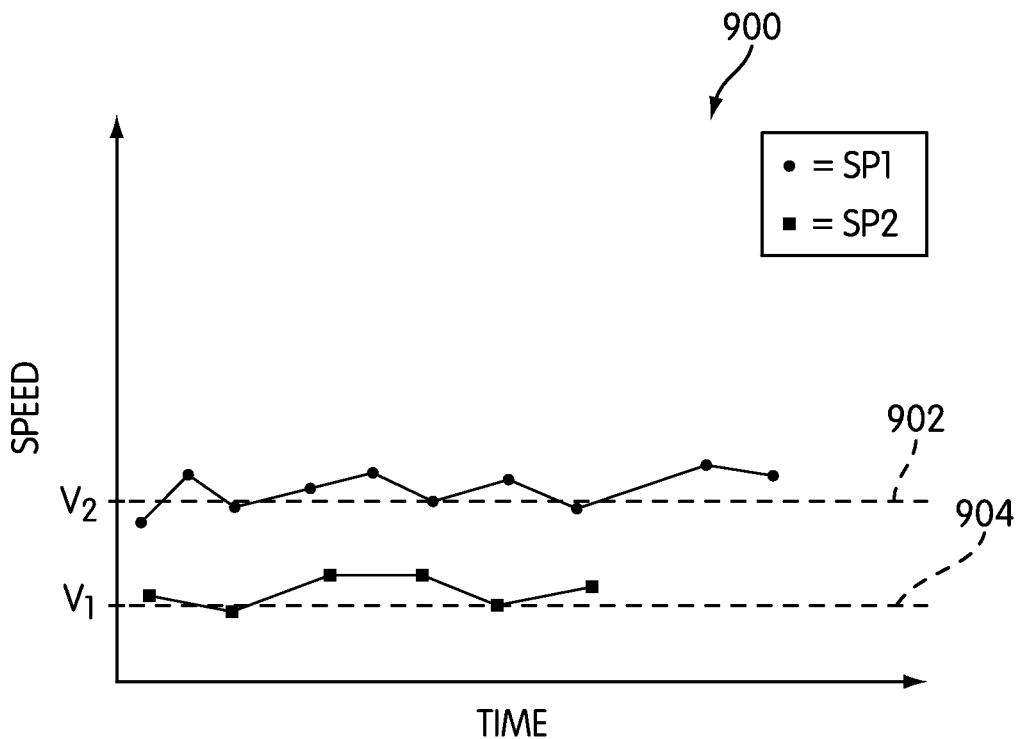
FIG. 9 is an illustration depicting speed patterns of collected probe data.

FIGS. 8 and 9 illustrate exemplary embodiments of speed patterns associated with the collected probe data. In FIG. 8, a graph 800 illustrates the relationship between the speed of the probe vehicles and the time at which the probe data was collected. As discussed above, in different embodiments, the time interval associated with the one or more speed patterns may be fixed and/or variable. In some embodiments, a first set of probe data may be associated with a first speed pattern SP1 and a second set of probe data may be associated with a second speed pattern SP2. In this embodiment, the first set of probe data associated with first speed pattern SP1 has an average speed 804 and the second set of probe data associated with second speed pattern SP2 has an average speed 802. In this embodiment, the first set of probe data includes data points from more probe vehicles than the second set of probe data. In the embodiment depicted in FIG. 8, the average speed 802 of the probe data associated with the second speed pattern SP2 is higher than the average speed 804 of the probe data associated with the first speed pattern SP1. In some cases, as described more fully below, the probe data associated with each of the first speed pattern SP1 and the second speed pattern SP2 may be stored in one or more traffic databases.

Similar to FIG. 8, FIG. 9 is a graph 900 that illustrates the relationship between the speed of the probe vehicles and the time at which the probe data was collected. In this embodiment, similar to FIG. 8, a first set of probe data may be associated with a first speed pattern SP1 and a second set of probe data may be associated with a second speed pattern SP2. In this embodiment, the first set of probe data associated with first speed pattern SP1 has an average speed 902 and the second set of probe data associated with second speed pattern SP2 has an average speed 904. Similar to FIG. 8, in FIG. 9, the first set of probe data includes data points from more probe vehicles than the second set of probe data. In contrast to FIG. 8, however, in the embodiment depicted in FIG. 9, the average speed 904 of the probe data associated with the second speed pattern SP2 is lower than the average speed 902 of the probe data associated with the first speed pattern SP1. In some cases, as described more fully below, the probe data associated with each of the first speed pattern SP1 and the second speed pattern SP2 may be stored in one or more traffic databases.

Figure 10:
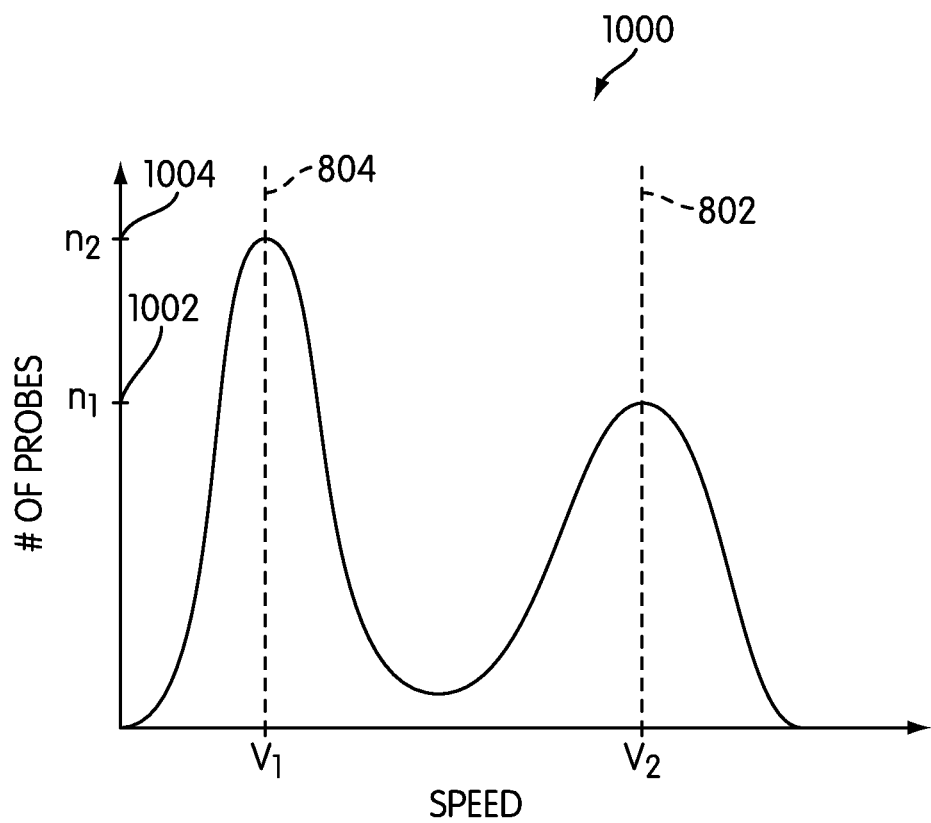
FIG. 10 is a schematic view of an exemplary embodiment of a method for determining a number of vehicles associated with a speed pattern.

FIG. 10 is an exemplary embodiment of a method for determining a number of vehicles associated with a speed pattern. In this embodiment, a distribution 1000 of the speeds of the probe vehicles may be plotted against the number of each probe vehicles. In this embodiment, the probe data associated with the speed patterns depicted in FIG. 8 are shown. In this embodiment, a first number 1002 of probe vehicles is associated with the average speed 802 of the probe data associated with the second speed pattern SP2. Similarly, a second number 1004 of probe vehicles is associated with the average speed 804 of the probe data associated with the first speed pattern SP1. In this embodiment, the first number 1002 is less than the second number 1004. In other embodiments, the first number may be greater than and/or equal to the second number. As discussed in more detail below, the number of vehicles determined to be associated with each of the speed patterns may be used to sort the respective probe data into an appropriate traffic database.

Figure 11:
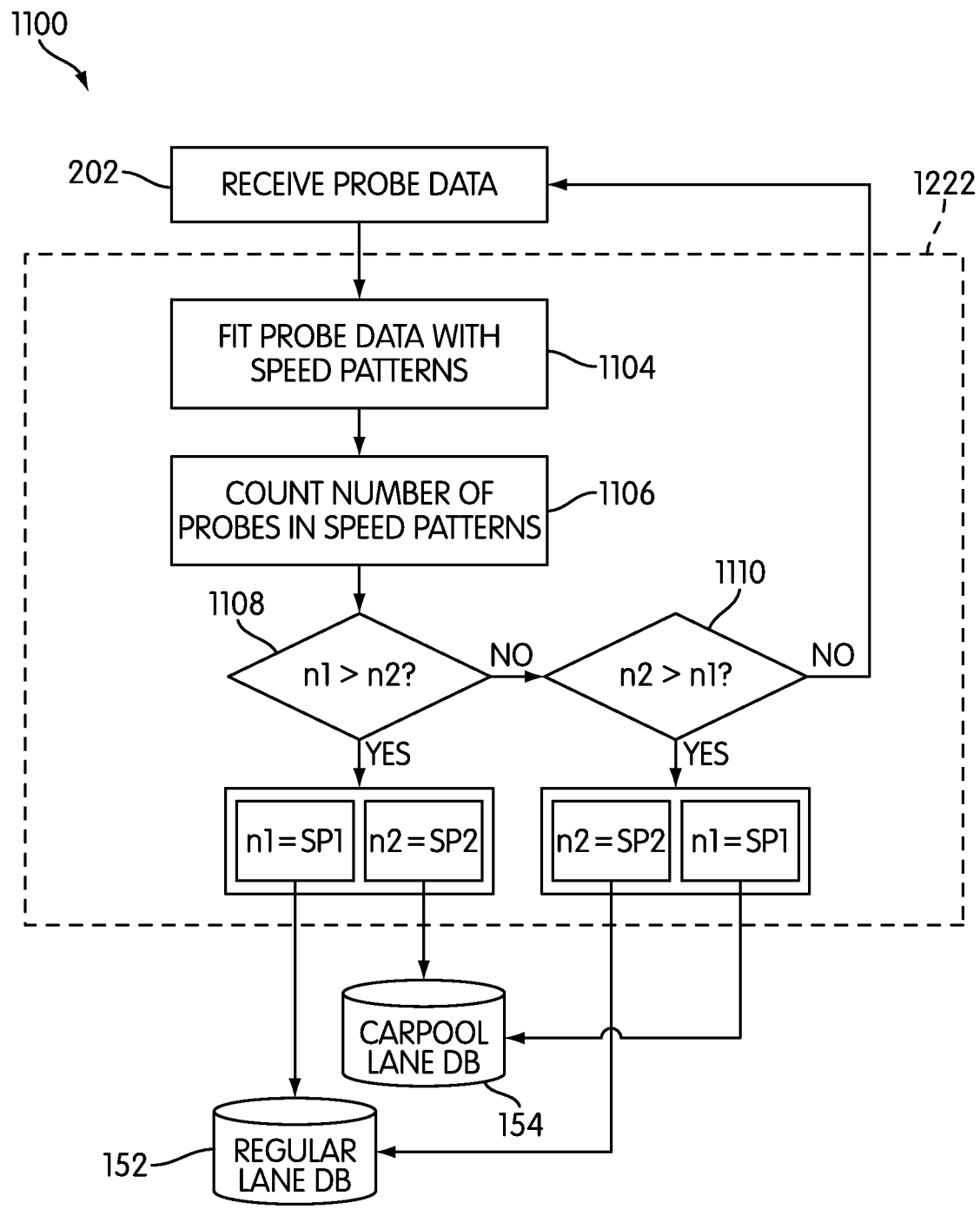
FIG. 11 is a schematic view of an exemplary embodiment of a method for differentiating collected probe data for storage in a traffic database.

FIG. 11 illustrates an exemplary embodiment of a method for differentiating collected probe data for storage in a traffic database. In this embodiment, the following steps of the method for differentiating collected probe data 1100 may be performed by remote server 150. In some embodiments, one or more of these steps may be performed by additional systems or devices associated with remote server 150, motor vehicle 102 and/or navigation system 100. The order of the steps illustrated in FIG. 11 is exemplary and not required. In addition, it will be understood that in other embodiments one or more of the following steps may be optional.

During first step 202, remote server may receive probe data from one or more probe vehicles. At second step 1102, the received probe data may be fit to one or more speed patterns. In some embodiments, the received probe data may be fit to a speed pattern as described above in regard to FIGS. 8 and 9. In other embodiments, the received probe data may be fit to other speed patterns, including, but not limited to determining average speed values associated with a roadway, road link, and/or travel lane at a particular time. Next, at third step 1106, the number of probe vehicles associated with each speed pattern may be counted. In an exemplary embodiment, the number of probe vehicles may be counted as described above in regard to FIG. 10.

In some embodiments, the remote server differentiates the probe data on the basis of the number of probe vehicles that gathered traffic data associated with each speed pattern. Because the number of vehicles traveling in a carpool lane of a roadway is usually smaller overall than the number of vehicles traveling in the regular lanes, the number of probe vehicles may be used to differentiate the regular lanes from the carpool lane. According to an exemplary embodiment, the number of probe vehicles associated with each speed pattern may be used to determine whether the probe data should be associated with the regular lanes or the carpool lane. In this embodiment, the remote server is configured so that a speed pattern with a great number of probe vehicles indicates a regular lane of a roadway.

Following step 1106, the remote server may proceed to step 1108. During step 1108, the remote server determines whether the first number of probe vehicles determined at step 1106 is greater than the second number of probe vehicles. If the first number of probe vehicles is greater than the second number, then the remote server stores the probe data associated with the first speed pattern SP1 in the regular lane database 152 and the probe data associated with the second speed pattern SP2 in the carpool lane database 154.

Instead, if at step 1108 the first number of probe vehicles is not greater than the second number, then the remote server proceeds to step 1110. At step 1110, the remote server determines whether the second number of probe vehicles determined at step 1106 is greater than the first number of probe vehicles. If the second number of probe vehicles is greater than the first number, then the remote server stores the probe data associated with the second speed pattern SP2 in the regular lane database 152 and the probe data associated with the first speed pattern SP1 in the carpool lane database 154.

Referring back to step 1110, if the remote server determines that the second number of probe vehicles is not greater than the first number, then the remote server returns to step 202 to receive additional probe data. The process may then repeat until the remote server stores the probe data in regular lane database 152 and/or carpool lane database 154.

Figure 12:
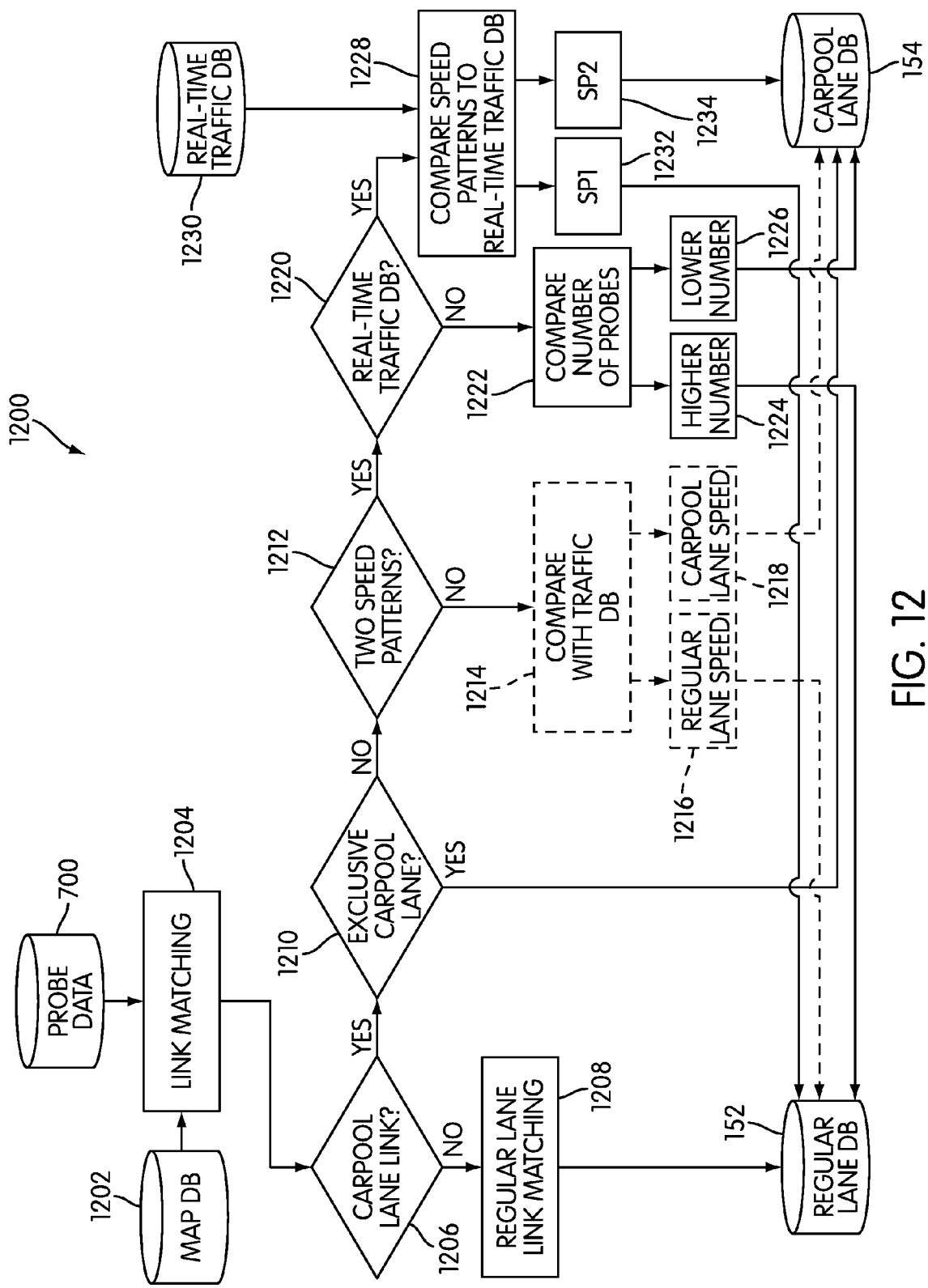
FIG. 12 is a schematic view of an exemplary embodiment of a method for sorting collected probe data for storage in a traffic database.

FIG. 12 illustrates an exemplary embodiment of a method for sorting collected probe data for storage in a traffic database. In this embodiment, method 1200 of sorting collected probe data may include one or more additional steps that may be performed by remote server 150. In some embodiments, method 1200 of sorting collected probe data may include one or more additional databases in communication with remote server 150. In other embodiments, one or more of these steps may be performed by additional systems or devices associated with remote server 150, motor vehicle 102 and/or navigation system 100. The order of the steps illustrated in FIG. 12 is exemplary and not required. In addition, it will be understood that in other embodiments one or more of the following steps may be optional.

At first step 1204, the remote server may perform link matching to correlate probe data 700 with one or more road links associated with a roadway stored in map database 1202. In some embodiments, at step 1204 the remote server may assign link identifiers to the matched probe data identifying specific road links contained in map database 1202. At second step 1206, the remote server determines whether any of the matched probe data identified at step 1204 includes a carpool lane link. If the matched probe data does not contain a carpool lane link, then at step 1208, the remote server determines that the matched probe data corresponds to a regular lane link. The remote server may store the regular lane link matched probe data in regular lane database 152.

Returning to step 1206, if the remote server determines that the matched probe data includes a carpool lane link, the remote server proceeds to step 1210. At step 1210, if the remote server determines that the carpool lane link identifies an exclusive carpool lane, then the matched probe data is stored in carpool lane database 154. If, at step 1210, the remote server determines that the carpool lane link is not an exclusive carpool lane, then the process proceeds to step 1212. Next, at step 1212, the remote server determines whether two speed patterns exist in the probe data 700. In this exemplary embodiment, the remote server may determine the presence of speed patterns as described above in regard to FIGS. 7-9.

In some embodiments, if the remote server does not determine that probe data 700 exhibits two speed patterns at step 1212, the remote server optionally may, at step 1214, compare the probe data 700 with a traffic database. The traffic database may include, but not is limited to a real-time and/or historical traffic database. At step 1214, the comparison with the traffic database may allow probe data 700 to be matched with a regular lane speed 1216 or a carpool lane speed 1218 based on real-time or historical traffic information in the traffic database. If the remote server matches probe data 700 to regular lane speed 1216, the matched probe data may be stored in regular lane database 152. Similarly, if the remote server matches probe data 700 to carpool lane speed 1218, the matched probe data may be stored in carpool lane database 154.

Returning to step 1212, if the remote server determines that probe data 700 exhibits two speed patterns, then at step 1220, the remote server determines whether a real-time traffic database 1230 is available. If real-time traffic database 1230 is not available, the remote server proceeds to step 1222. At step 1222, the remote server compares the number of probe vehicles associated with each speed pattern as discussed above in regard to FIG. 11. In this exemplary embodiment, the remote server is arranged so that if the probe data identifies two distinct speed patterns, the speed pattern that is associated with a lower number of probe vehicles identifies a carpool lane of a roadway. With this arrangement, the lower number of probe vehicles 1226 identifies the probe data as being associated with a carpool lane of a roadway. Accordingly, the remote server stores that probe data in carpool lane database 154. Whereas, the higher number of probe vehicles 1224 identifies the probe data as being associated with a regular lane of a roadway and the remote server stores that probe data in regular lane database 152.

Instead, if at step 1220 the remote server determines that real-time traffic database 1230 is available, then at next step 1228, the remote server may retrieve real-time traffic information from real-time traffic database 1230. Generally, the real-time traffic information may be any type of traffic information gathered using any method known in the art. In some cases, the real-time traffic information may be determined by monitoring the travel times of various users that are also in communication with the remote server. In particular, in situations where a remote server is in communication with multiple vehicles in a vehicle communication network, each associated with a navigation system, the travel times of the users on various roadways may be collected and stored as real-time traffic information. In other cases, the real-time traffic information may be determined by sending out dedicated vehicles on various roadways to determine real-time traffic information. In still other cases, real-time traffic database 1230 may include historical traffic data associated with average traffic patterns over particular roadways at various times and/or dates may be used. With this arrangement, travel times for various routes may be calculated more accurately to include variations in travel time due to various traffic conditions.

At step 1228, the speed patterns of probe data 700 may be compared with a first speed pattern 1232 associated with regular lanes of a roadway and/or a second speed pattern 1234 associated with a carpool lane of a roadway based on real-time or historical traffic information in real-time traffic database 1230. If the remote server matches a first portion of probe data to first speed pattern 1232, the matched first portion of probe data may be stored in regular lane database 152. Similarly, if the remote server matches a second portion of probe data to second speed pattern 1234, the matched second portion of probe data may be stored in carpool lane database 154.

The methods described above and illustrated in the Figures for determining traffic information to be stored in one or more traffic databases and to be used by a remote server are only intended to be illustrative. In other embodiments, any other methods for determining traffic information may be used. For example, in some cases, historical traffic information may be used. Furthermore, the methods discussed above for gathering real-time traffic information may also be stored and used to determine historical traffic information as well. For example, in cases where real-time traffic information may not be known for a particular roadway, previously stored traffic information recorded in the manners illustrated in above over some period of time may be used to determine average traffic patterns that depend on the time of day and/or day of the week. These averages provide historical traffic information that may be used in estimating travel routes even when real-time traffic information is not available.

Additionally, while in the above described embodiments a carpool lane may be distinguished from a regular lane based on speed patterns associated with the observed probe data, other methods may be used to determine whether the information associated with a particular roadway collected by probe vehicles is associated with a regular lane or a carpool lane. In some embodiments, other methods may be used that do not provide a single dispositive determination of whether a probe data is associated with a carpool lane or a regular lane. Instead, various methods may be used that detect one or more conditions associated with a carpool lane that indicate a likelihood or probability that a particular vehicle is in a carpool lane or a regular lane. With this arrangement, a vehicle may be determined to have an approximate probability of traveling in a carpool lane based on the presence or absence of various conditions associated with a carpool lane.

At different locations, depending on the local jurisdiction, various rules may apply to vehicles to determine eligibility to travel in a carpool lane. For example, in some areas, a vehicle must have two or more occupants to travel in a carpool lane. In other areas, vehicles may be required to have a greater number of occupants to travel in a carpool lane. In addition, in some cases, specified classes of vehicles may be authorized to travel in carpool lanes, including, but not limited to: motorcycles, hybrid vehicles, low-emission vehicles, alternate fuel vehicles, and other types of vehicles. Further, in some cases, a lane may be a "full-time" carpool lane or may only be a carpool lane during some times of day, such as rush hour, and may not have a vehicle restriction during other times of day. Additionally, in some cases, the location of a carpool lane may vary. In some cases, the carpool lane may be located on the far left lane of travel or may be located on the far right lane of travel. In still other cases, the carpool lane may be a stand-alone roadway.

FIGS. 13 through 16 illustrate various exemplary embodiments of scenarios for determining a vehicle's likelihood of being in a carpool lane based on different detected conditions that may be associated with a carpool lane. It should be understood that the scenarios illustrated herein are merely exemplary, and any other factors or conditions may be used to determine a vehicle's likelihood or probability of traveling in a carpool lane. In addition, it should further be understood that the probabilities included in the various scenarios are exemplary and are intended only for the purposes of illustrating the principles described therein. Actual probabilities may have different values and/or may be determined using different weighting systems than the 0%-100% embodiments described below.

Figure 13:
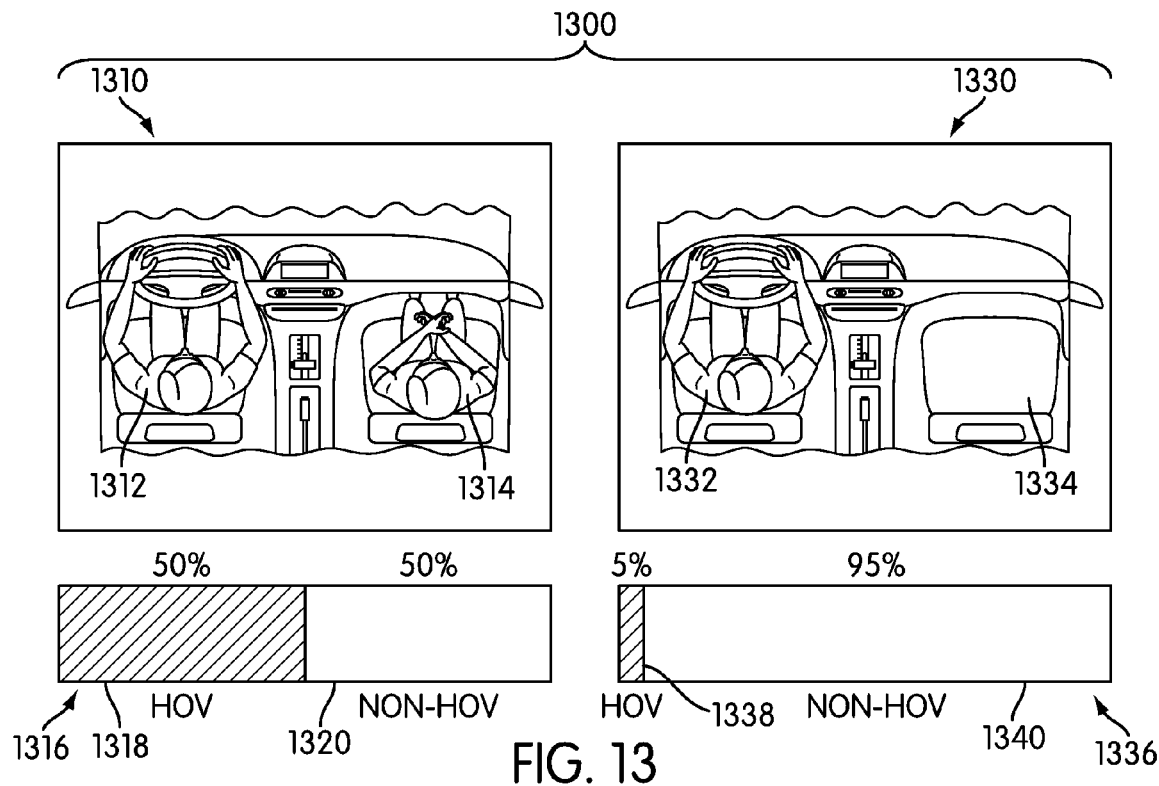
FIG. 13 is a representational view of an exemplary embodiment of a scenario for determining a vehicle's likelihood of being in a carpool lane based on passenger data.

Referring now to FIG. 13, a first scenario 1300 is illustrated for determining a vehicle's likelihood of being in a carpool or HOV lane based on passenger data. In some cases, a vehicle may be permitted to travel in a carpool lane based on meeting a certain vehicle occupancy requirement. In some embodiments, a vehicle may include one or more sensors for detecting the number of occupants and/or the presence of a passenger in a vehicle. In one embodiment, a vehicle may include a weight sensor for detecting an occupant seated in a passenger seat of a vehicle. In other embodiments, a vehicle may include a seat belt sensor for detecting an engaged seatbelt of an occupant seated in the passenger seat. In various embodiments, one or more alternative methods of detecting or determining the presence of vehicle occupants may be used to determine whether a vehicle satisfies an occupancy requirement associated with a carpool or HOV lane.

In an exemplary embodiment, the number of occupants in a vehicle may be associated with a probability that the vehicle is traveling in a carpool or HOV lane. As shown in FIG. 13, first scenario 1300 may include a condition 1310 associated with the presence of two or more occupants in a vehicle. In this embodiment, the vehicle may include a driver 1312 and a passenger 1314. Based on condition 1310 being associated with two or more occupants, a likelihood or probability 1316 may be determined of the vehicle traveling in a carpool or HOV lane. In this embodiment, condition 1310 associated with two or more occupants may be associated with a 50% probability 1318 that the vehicle is traveling in a carpool or HOV lane and a 50% probability 1320 that the vehicle is traveling in a non-HOV lane.

On the other hand, first scenario 1300 may include a condition 1330 associated with the presence of one occupant in the vehicle. In this embodiment, the vehicle may include a driver 1332 and an empty passenger seat 1334. Based on condition 1330 being associated with only one occupant, a likelihood or probability 1336 may be determined of the vehicle traveling in a carpool or HOV lane. In this embodiment, condition 1330 associated with one occupant may be associated with a 5% probability 1338 that the vehicle is traveling in a carpool or HOV lane and a 95% probability 1340 that the vehicle is traveling in a non-HOV lane. In this embodiment, probability 1338 of the vehicle traveling in the HOV lane associated with condition 1330 is significantly lower than probability 1318 associated with condition 1310. Such a discrepancy in probabilities may be configured to take into account the relative high proportion of carpool or HOV lanes that have occupancy requirements of two or more occupants.

Figure 14:
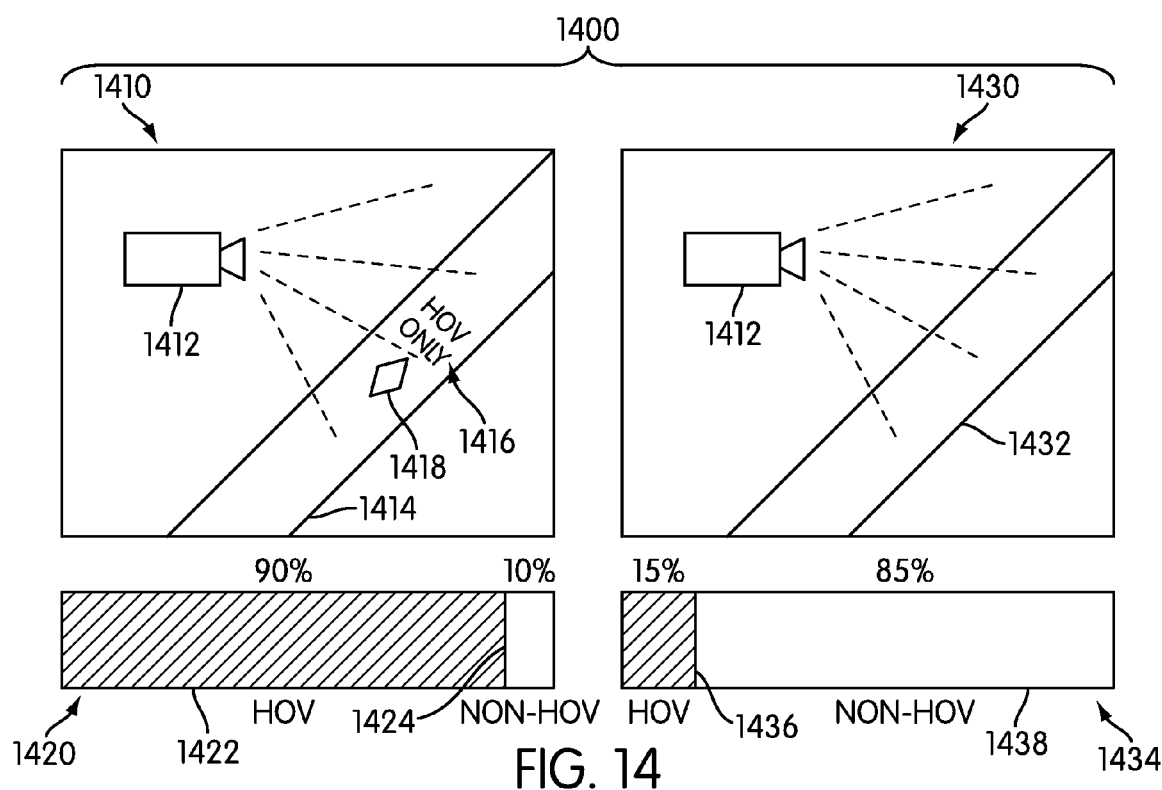
FIG. 14 is a representational view of an exemplary embodiment of a scenario for determining a vehicle's likelihood of being in a carpool lane based on road image data.

Referring now to FIG. 14, a second scenario 1400 is illustrated for determining a vehicle's likelihood of being in a carpool or HOV lane based on road image data. In some cases, a vehicle may detect its presence in a carpool or HOV lane based on processing image data of the roadway from an image sensor, including, but not limited to: a camera or other optical sensor. In some embodiments, the processed image data may include one or more indicia of a carpool or HOV lane detected on the roadway.

In an exemplary embodiment, the presence of absence of detected indicia of a carpool or HOV lane from processed image data may be associated with a probability that the vehicle is traveling in a carpool or HOV lane. As shown in FIG. 14, second scenario 1400 may include a condition 1410 associated with the presence of indicia of a carpool or HOV lane in processed image data of a roadway 1414. In this embodiment, the vehicle may include a camera 1412 that detects one or more indicia of a carpool or HOV lane in processed image data of roadway 1414. In this embodiment, indicia may include text 1416 on roadway 1414 that states that roadway 1414 is "HOV ONLY" or similar. Indicia on roadway 1414 may also include symbols commonly used to indicate a carpool or HOV lane, including, but not limited to a diamond 1418. Based on condition 1410 being associated with the presence of detected indicia of a carpool or HOV lane from processed image data on roadway 1414, a likelihood or probability 1420 may be determined of the vehicle traveling in a carpool or HOV lane. In this embodiment, condition 1410 associated with the presence of detected indicia may be associated with a 90% probability 1422 that the vehicle is traveling in a carpool or HOV lane and a 10% probability 1424 that the vehicle is traveling in a non-HOV lane.

On the other hand, second scenario 1400 may include a condition 1430 associated with the absence of any detected indicia of a carpool or HOV lane from processed image data. In this embodiment, camera 1412 in the vehicle may not detect any indicia of a carpool or HOV lane on a roadway 1432. Based on condition 1430 being associated with the absence of indicia of a carpool or HOV lane from processed image data on roadway 1432, a likelihood or probability 1434 may be determined of the vehicle traveling in a carpool or HOV lane. In this embodiment, condition 1430 associated with the absence of detected indicia may be associated with a 15% probability 1436 that the vehicle is traveling in a carpool or HOV lane and an 85% probability 1438 that the vehicle is traveling in a non-HOV lane. In this embodiment, probability 1436 of the vehicle traveling in the HOV lane associated with condition 1430 may be lower than probability 1422 associated with condition 1410. This difference in probabilities may be configured to take into account that while a roadway containing indicia of a carpool or HOV lane is likely to be an HOV lane, not all HOV lanes may include such indicia.

Figure 15:
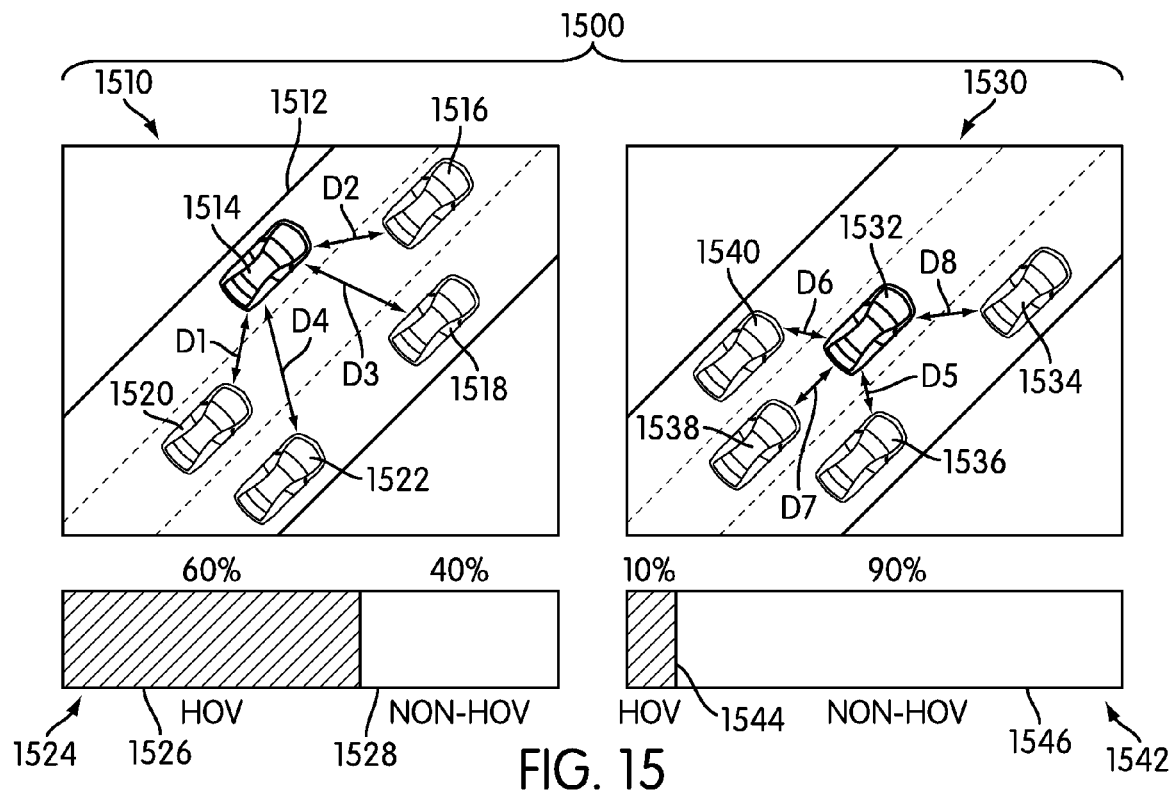
FIG. 15 is a representational view of an exemplary embodiment of a scenario for determining a vehicle's likelihood of being in a carpool lane based on relative location data.

Referring now to FIG. 15, a third scenario 1500 is illustrated for determining a vehicle's likelihood of being in a carpool or HOV lane based on relative location data. In some cases, a vehicle's presence in a carpool or HOV lane may be determined based on processing relative location data from one or more other vehicles. In some embodiments, the vehicle may determine its own location using on-board sensors, including, but not limited to a GPS sensor or other geographic position sensor. Additionally, in some embodiments, the vehicle may include one or more sensors that receive data associated with one or more other vehicles in proximity to the vehicle, including data containing information associated with latitude and longitude, relative location, speed, heading, time and any other dynamic vehicle information. In other embodiments, the data associated with one or more of the vehicles may be received by a remote server to determine relative location and/or position of the vehicles on the roadway.

In an exemplary embodiment, relative location data from one or more other vehicles may be associated with a probability that the vehicle is traveling in a carpool or HOV lane. In some cases, carpool or HOV lanes may be disposed to the far left of a multi-lane roadway. As shown in FIG. 15, third scenario 1500 may include a condition 1510 associated with a relative location of a vehicle 1514 that indicates a probability of vehicle 1514 traveling in a carpool or HOV lane of a multi-lane roadway 1512. In this embodiment, data may be received from one or more other vehicles in proximity to vehicle 1514, including a first remote vehicle 1516, a second remote vehicle 1518, a third remote vehicle 1520, and a fourth remote vehicle 1522. In this embodiment, information associated with latitude and longitude, relative location, speed, heading, time and any other dynamic vehicle information may be received for each of first remote vehicle 1516, second remote vehicle 1518, third remote vehicle 1520, and fourth remote vehicle 1522.

In some embodiments, vehicle 1514 and/or a remote server may use the received data to determine a relative location of vehicle 1514 compared to one or more of the remote vehicles. In one embodiment, vehicle 1514 and/or the remote server may use latitude and longitude information associated with each of the remote vehicles to determine the relative position of vehicle 1514. In this embodiment, the received latitude and longitude information from each of first remote vehicle 1516, second remote vehicle 1518, third remote vehicle 1520, and fourth remote vehicle 1522 may be processed to determine that vehicle 1514 is located at a far left position on multi-lane roadway 1512 compared to any of the remote vehicles. Based on condition 1510 being associated with the location of vehicle 1514 to the far left of multi-lane roadway 1512, a likelihood or probability 1524 may be determined of vehicle 1514 traveling in a carpool or HOV lane. In this embodiment, condition 1510 associated with the location of vehicle 1514 to the far left of multi-lane roadway 1512 may be associated with a 60% probability 1526 that vehicle 1514 is traveling in a carpool or HOV lane and a 40% probability 1528 that vehicle 1514 is traveling in a non-HOV lane.

In some embodiments, the received data associated with one or more other vehicles in proximity to vehicle 1514 may be weighted based on one or more factors. In one embodiment, a closeness weighting factor may be determined that weights the received data from the remote vehicles in proximity to vehicle 1514 based on a distance to vehicle 1514. Referring again to condition 1510 of FIG. 15, in this embodiment, vehicle 1514 may be located a first distance D1 from third remote vehicle 1520. Vehicle 1514 may be located a second distance D2 from first remote vehicle 1516. In this case, first distance D1 may be smaller than second distance D2. Similarly, vehicle 1514 may be located a third distance D3 from second remote vehicle 1518. In some cases, third distance D3 may be greater than first distance D1 and/or second distance D2. Additionally, vehicle 1514 also may be located a fourth distance D4 from fourth remote vehicle 1522.

Fourth distance D4 may be greater than any of third distance D3, first distance D1, and/or second distance D2.

In an exemplary embodiment, the received data from the remote vehicles may be processed according to a closeness weighting factor based on each remote vehicle's distance from vehicle 1514. In one embodiment, data received from remote vehicles in greater proximity to vehicle 1514 may be given a greater weight. In the current embodiment, received data from third remote vehicle 1520 located at first distance D1 from vehicle 1514 may be weighted greater than received data from first remote vehicle 1516 located at second distance D2 from vehicle 1514. Similarly, received data from second remote vehicle 1518 located at third distance D3 from vehicle 1514 may be weighted less than both the received data from first remote vehicle 1516 and third remote vehicle 1520.

Additionally, in some embodiments, data received from remote vehicles beyond a predetermined distance may be given a low or zero weight. With this arrangement, received data from vehicles that are beyond the predetermined distance from vehicle 1514 is not taken into account. In the current embodiment, received data from fourth remote vehicle 1522 located at fourth distance D4 may be given a low or zero weight when fourth distance D4 is beyond the predetermined distance from vehicle 1514. With this arrangement, received data from remote vehicles that are less relevant for determining the relative location of vehicle 1514 may not be used.

In other embodiments, the received data from the remote vehicles may be processed according to different weighting factors based on various information associated with the remote vehicles. In one embodiment, received data from remote vehicles may be weighted based on a time difference between a time associated with vehicle 1514 and the reporting time of the data associated with each remote vehicle. In one embodiment, data received from remote vehicles associated with a reporting time closer to the time associated with vehicle 1514 may be given a greater weight. With this arrangement, received data from remote vehicles that is most current may be given the most weight by vehicle 1514.

In other cases, third scenario 1500 may include a condition 1530 associated with a relative location of vehicle 1514 that is not disposed to the far left lane of a multi-lane roadway. In this embodiment, data may be received from one or more other vehicles in proximity to vehicle 1514 as described above, including a first remote vehicle 1534, a second remote vehicle 1536, a third remote vehicle 1538, and a fourth remote vehicle 1540. In this embodiment, information associated with latitude and longitude, relative location, speed, heading, time and any other dynamic vehicle information may be received from each of first remote vehicle 1534, second remote vehicle 1536, third remote vehicle 1538, and fourth remote vehicle 1540.

In some embodiments, the received data may be used to determine a relative location of vehicle 1514 compared to one or more of the remote vehicles as described above with reference to condition 1510. In one embodiment, the latitude and longitude information associated with each of the remote vehicles may be used to determine the relative position of vehicle 1514. In this embodiment, the received latitude and longitude from each of first remote vehicle 1534, second remote vehicle 1536, third remote vehicle 1538, and fourth remote vehicle 1540 may be processed to determine that vehicle 1514 is not located at a far left position on the multi-lane roadway compared to any of the remote vehicles. In some cases, receiving information from at least one remote vehicle that is to the left of vehicle 1514 may be used to determine that vehicle 1514 is not located in a far left position of the multi-lane roadway.

Based on condition 1530 being associated with the location of vehicle 1514 not to the far left of the multi-lane roadway, a likelihood or probability 1542 may be determined of vehicle 1514 traveling in a carpool or HOV lane. In this embodiment, condition 1530 associated with the location of vehicle 1514 not to the far left of the multi-lane roadway may be associated with a 10% probability 1544 that vehicle 1514 is traveling in a carpool or HOV lane and a 90% probability 1546 that vehicle 1514 is traveling in a non-HOV lane. In this embodiment, probability 1544 of the vehicle traveling in the HOV lane associated with condition 1530 may be substantially lower than probability 1526 associated with condition 1510. This difference in probabilities may be configured to take into account that a far left lane of a multi-lane roadway is more likely to be associated with a carpool or HOV lane than a lane that is not to the far left. In other areas, a lane to the far right of a multi-lane roadway, or a dedicated lane, may instead be associated with a carpool or HOV lane. In such embodiments, the probabilities and processing of relative location of vehicle 1514 as described in third scenario 1500 may be adjusted accordingly.

In some embodiments, the received data associated with one or more other vehicles in proximity to vehicle 1514 may be weighted based on one or more factors as described above. Additionally, in one embodiment, a closeness threshold may be determined based on a distance of remote vehicle to vehicle 1514 that may be associated with vehicle 1514 not traveling in a carpool or HOV lane. For example, in some circumstances, a closeness threshold associated with one or more remote vehicles within a predetermined distance of vehicle 1514 may indicate traffic congestion. In some embodiments, traffic congestion may indicate a lesser likelihood that a vehicle is traveling in a carpool or HOV lane.

Referring again to condition 1530 of FIG. 15, in this embodiment, vehicle 1514 may be located a fifth distance D5 from second remote vehicle 1536. Vehicle 1514 may be located a sixth distance D6 from fourth remote vehicle 1540. In this case, fifth distance D5 may be smaller than sixth distance D6. In other cases, fifth distance D5 and sixth distance D6 may be approximately equal. Similarly, vehicle 1514 may be located a seventh distance D7 from third remote vehicle 1538 and an eighth distance D8 from first remote vehicle 1534. In some cases, seventh distance D7 and/or eighth distance D8 may be greater than fifth distance D5 and/or sixth distance D6. In this embodiment, any one or more of fifth distance D5, sixth distance D6, seventh distance D7, and/or eighth distance D8 may be less than a predetermined closeness threshold that is associated with traffic congestion. With this arrangement, when the distance of one or more remote vehicles from vehicle 1514 indicates that traffic congestion is likely, a smaller probability or likelihood that vehicle 1514 is traveling in a carpool or HOV lane may be determined. As a result, the probability 1542 may be adjusted accordingly.

Figure 16:
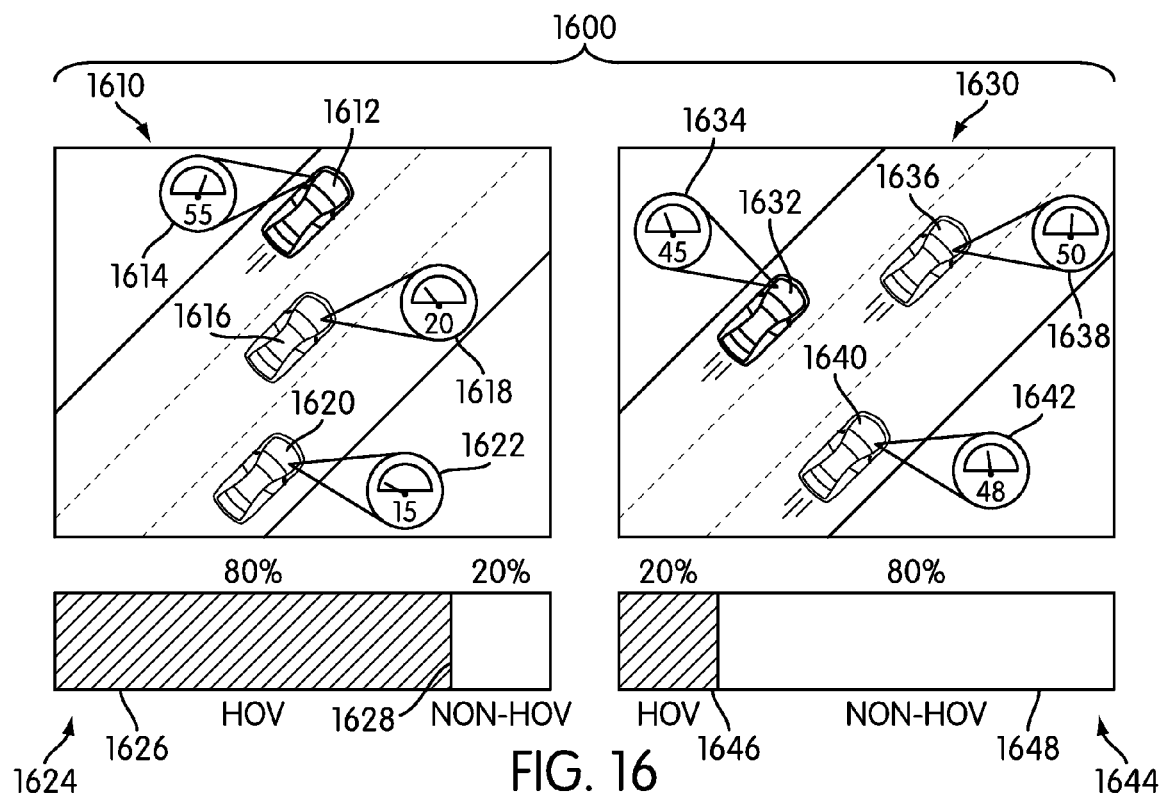
FIG. 16 is a representational view of an exemplary embodiment of a scenario for determining a vehicle's likelihood of being in a carpool lane based on speed data.

Referring now to FIG. 16, a fourth scenario 1600 is illustrated for determining a vehicle's likelihood of being in a carpool or HOV lane based on based on speed data. In some cases, a vehicle's presence in a carpool or HOV lane may be determined based on speed data from one or more vehicles. In an exemplary embodiment, speed data from probe vehicles may be processed using any of the methods described above to determine whether the data is associated with a carpool lane or a regular lane.

In an exemplary embodiment, speed data from one or more other vehicles may be associated with a probability that the vehicle is traveling in a carpool or HOV lane, as described above. In some cases, carpool or HOV lanes may be associated with a higher speed than regular or non-HOV lanes. As shown in FIG. 16, fourth scenario 1600 may include a condition 1610 associated with a speed of a vehicle 1612 that indicates a probability of vehicle 1612 traveling in a carpool or HOV lane of a multi-lane roadway. In this embodiment, speed data may be received from one or more other vehicles in proximity to vehicle 1612, including a first remote vehicle 1616 and a second remote vehicle 1620. In this embodiment, vehicle 1612 may be associated with speed data having a first value 1614. Similarly, first remote vehicle 1616 may be associated with speed data having a second value 1618. Second remote vehicle 1620 may further be associated with speed data having a third value 1622. In this embodiment, first value 1614 of the speed data associated with vehicle 1612 may be significantly higher than second value 1618 and/or third value 1622 of the speed data associated with, respectively, first remote vehicle 1616 and/or second remote vehicle 1620. For example, in this embodiment, first value 1614 may be 55 mph, second value 1618 may be 20 mph, and third value 1622 may be 15 mph. In this embodiment, the maximum difference in speed data between any of the vehicles is approximately 40 mph. In other embodiments, the values may be different. In addition, in other embodiments, speed data may be determined to be higher based on a smaller or a larger maximum difference in speed data.

Based on condition 1610 being associated with a higher speed value for vehicle 1612 than either of second value 1618 and/or third value 1622 for first remote vehicle 1616 and/or second remote vehicle 1620, a likelihood or probability 1624 may be determined of vehicle 1612 traveling in a carpool or HOV lane. In this embodiment, condition 1610 associated with a higher speed of vehicle 1612 may be associated with an 80% probability 1626 that vehicle 1612 is traveling in a carpool or HOV lane and a 20% probability 1628 that vehicle 1612 is traveling in a non-HOV lane.

In other cases, fourth scenario 1600 may include a condition 1630 associated with an approximately similar speed of one or more vehicles on a multi-lane roadway. In this embodiment, speed data may be received from one or more other vehicles in proximity to a vehicle 1632, including a first remote vehicle 1636 and a second remote vehicle 1640. In this embodiment, vehicle 1632 may be associated with speed data having a first value 1634. Similarly, first remote vehicle 1636 may be associated with speed data having a second value 1638. Second remote vehicle 1640 may further be associated with speed data having a third value 1642. In this embodiment, first value 1634 of the speed data associated with vehicle 1632 may be approximately similar as second value 1638 and/or third value 1642 of the speed data associated with, respectively, first remote vehicle 1636 and/or second remote vehicle 1640. For example, in this embodiment, first value 1634 may be 45 mph, second value 1638 may be 50 mph, and third value 1642 may be 48 mph. In this embodiment, the maximum difference in speed data between any of the vehicles is approximately 5 mph. In other embodiments, the values may be different. In addition, in other embodiments, speed data may be determined to be approximately similar based on a smaller or a larger maximum difference in speed data.

Based on condition 1630 being associated with an approximately similar speed value for vehicle 1632 as second value 1638 and/or third value 1642 for first remote vehicle 1636 and/or second remote vehicle 1640, a likelihood or probability 1644 may be determined of vehicle 1632 traveling in a carpool or HOV lane. In this embodiment, condition 1630 associated with an approximately similar speed of vehicle 1632 may be associated with a 20% probability 1646 that vehicle 1632 is traveling in a carpool or HOV lane and an 80% probability 1648 that vehicle 1632 is traveling in a non-HOV lane. In this embodiment, probability 1646 of the vehicle traveling in the HOV lane associated with condition 1630 is significantly lower than probability 1626 associated with condition 1610. Such a discrepancy in probabilities may be configured to take into account higher average speeds for vehicles traveling in carpool or HOV lanes.

Additionally, in some embodiments, the speed data associated with one or more remote vehicles in proximity to a vehicle may be weighted based on one or more factors as described above in regards to FIG. 15. In an exemplary embodiment, speed data may be weighted based on a time difference between a time associated with a vehicle and the reporting time of the data associated with each remote vehicle. In one embodiment, speed data received from remote vehicles associated with a reporting time close to the time associated with a vehicle may used to determine the difference in values of the speed data. In other embodiments, data received from one or more vehicles, including, but not limited to, data containing information associated with latitude and longitude, relative location, speed, heading, time and any other dynamic vehicle information, may be weighted using different factors.

In some embodiments, several different methods of determining the presence or probability of a vehicle traveling in a carpool lane or a regular lane may be used together to determine whether the data associated with the vehicle should be associated with a carpool lane or a regular lane. In one embodiment, two or more different methods that indicate a likelihood or probability that a vehicle is in a carpool lane or a regular lane may be combined into a single calculation. In an exemplary embodiment, a method for determining whether a vehicle is traveling in a carpool lane or a regular lane may use two or more methods illustrated in FIGS. 13 through 16 to combine multiple probabilities of a vehicle traveling in a carpool lane into a single calculation.

Figure 17:
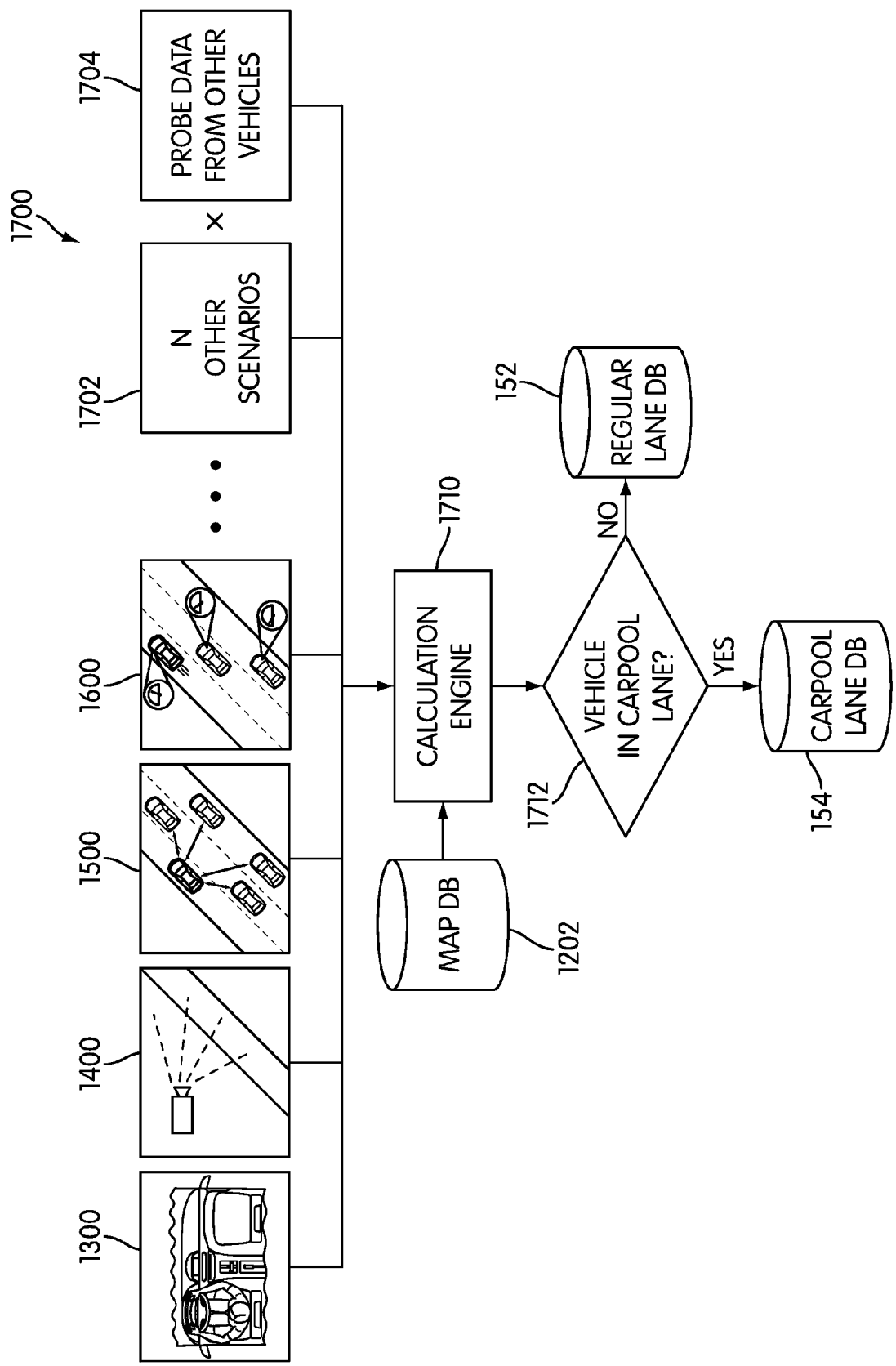
FIG. 17 is a schematic view of an exemplary embodiment of a method for deciding whether a vehicle is in a carpool lane based on information from multiple scenarios.

Referring now to FIG. 17, a method 1700 for determining whether a vehicle is traveling in a carpool lane or a regular lane may use two or more probabilities calculated based on different conditions associated with a vehicle traveling in a carpool lane. In this embodiment, method 1700 may use two or more probabilities determined based on conditions associated with any of first scenario 1300, second scenario 1400, third scenario 1500, fourth scenario 1600, and/or any additional number N other scenarios 1702. Other scenarios may include various other conditions that may be associated with a likelihood or probability that a vehicle is traveling in carpool lane. For example, in some cases, other scenarios may take into account classes of vehicles that are exempt from carpool or HOV restrictions, a driver's personal information or profile that may include information about children in car seats, emergency vehicles, carpool lane violators, and/or other scenarios that include conditions associated with travel in a carpool or HOV lane.

In some embodiments, method 1700 for determining whether a vehicle is traveling in a carpool lane or a regular lane may weight the various probabilities associated with any of the different scenarios. Further, in some embodiments, method 1700 may use additional information obtained from probe data collected by other vehicles 1704 to further weight the various probabilities. In one embodiment, method 1700 may use a calculation engine 1710 to combine two or more probabilities determined based on conditions associated with any of first scenario 1300, second scenario 1400, third scenario 1500, fourth scenario 1600, and/or any additional number N other scenarios 1702 to determine whether a vehicle is traveling in a carpool lane or a regular lane. In some cases, calculation engine 1710 may be a processor for combining the various probabilities and taking into account various weightings and probe data from other vehicles 1704. In other cases, calculation engine 1710 may be a computer program adapted to run on a remote server.

In some embodiments, calculation engine 1710 may combine two or more probabilities of a vehicle being associated with a carpool lane into a single equation. In one embodiment, calculation engine 1710 may use a single equation that is derived using Bayes' Theorem or Bayesian Rule. Generally, Bayes' Theorem relates the conditional and marginal probabilities of various random events. Using a Bayesian Rule, probabilities of different events occurring may be determined given certain observed scenarios. As a result, the probability of an event occurring generally increases as more prior information from observed scenarios is provided. In this embodiment, calculation engine 1710 may use a Bayesian Rule to combine the various probabilities determined based on conditions associated with any of first scenario 1300, second scenario 1400, third scenario 1500, fourth scenario 1600, and/or any additional number N other scenarios 1702 to determine whether a vehicle is traveling in a carpool lane or a regular lane. With this arrangement, calculation engine 1710 may obtain a more accurate probability of a vehicle traveling in a carpool lane than any of the individual scenarios above.

In some embodiments, calculation engine 1710 may be located at a remote server and may use a Bayesian Rule to differentiate collected probe data associated with a roadway between a carpool lane database and a regular lane database. In this embodiment, calculation engine 1710 may receive multiple probabilities that a vehicle is traveling in a carpool lane or a regular lane from the conditions associated with any of first scenario 1300, second scenario 1400, third scenario 1500, fourth scenario 1600, and/or any additional number N other scenarios 1702. Calculation engine 1710 may apply a Bayesian Rule to use a single equation combining the multiple probabilities to determine whether the vehicle is located in the carpool lane at step 1712. If, based on the outcome of the equation, calculation engine 1710 determines that the vehicle was traveling in the carpool lane when the road data was collected, then the collected road data from the vehicle may be stored in carpool lane database 154. If the calculation engine 1710 instead determines that the vehicle was not traveling in the carpool lane, then the collected road data may be stored in regular lane database 152. Calculation engine 1710 may repeat the process for each probe vehicle that has collected data associated with one or more roadways associated with map database 1202. With this arrangement, a remote server may differentiate collected probe data between a regular lanes database and a carpool lanes database.

While the foregoing method is based on an application of Bayes' Theorem, in different embodiments, other methods may be used by the remote server to combine the probabilities from the various scenarios to determine whether a vehicle is traveling in a carpool lane or a regular lane. For example, fuzzy logic, neutral networks, or any other processing methods may be used to combine the multiple probabilities into a single determinative outcome.

While various embodiments of the invention have been described as being used in connection with associating road data with a carpool or HOV lane, it should be understood that the methods and systems described herein also may be used in connection with discriminating lane-level road data in connection with any type of road.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for storing probe data gathered by a navigation system at a remote server, comprising:
   receiving data from a plurality of probe vehicles at the remote server;
   determining at least two speed patterns associated with the received data;
   classifying the received data from each of the plurality of probe vehicles according to one of a first speed pattern and a second speed pattern;
   calculating a first number of probe vehicles associated with the first speed pattern;
   calculating a second number of probe vehicles associated with the second speed pattern;
   comparing the first number of probe vehicles associated with the first speed pattern with the second number of probe vehicles associated with the second speed pattern;
   wherein based on the step of comparing the first number of probe vehicles with the second number of probe vehicles, additionally performing the steps of:
   storing the data classified as the first speed pattern in a regular lanes database;
   storing the data classified as the second speed pattern in a carpool lanes database; and
   wherein the data is classified as the first speed pattern if the comparison of the first number of probe vehicles with the second number of probe vehicles determines that the number of probe vehicles associated with the first speed pattern is greater than the number of probe vehicles associated with the second speed pattern.

2. The method according to claim 1, further comprising:
   matching the received data from each of the plurality of probe vehicles to one of a plurality of links included in a map database in communication with the remote server.

3. The method according to claim 2, wherein the step of matching the received data includes a step of identifying a carpool lane link.

4. The method according to claim 1, further comprising:
   receiving traffic information from a traffic database in communication with the remote server; and
   comparing the received data from each of the plurality of probe vehicles to the traffic information.

5. The method according to claim 4, wherein the traffic database is a real-time traffic database.

6. The method according to claim 4, wherein the traffic database is an historical traffic database.

7. The method according to claim 1, wherein the step of calculating the number of probe vehicles is performed for a set time interval.

8. The method according to claim 1, wherein the at least two speed patterns are each determined based on an average speed value of the plurality of probe vehicles associated with a particular roadway, road link, and/or travel lane at a particular time.

9. A method for differentiation of collected probe data from a navigation system at a remote server in communication with a regular lanes database and a carpool lanes database, comprising:
   receiving probe data from a plurality of vehicles at the remote server;

fitting the received probe data to one of a first speed pattern and a second speed pattern;
determining a first number of vehicles associated with the received probe data fitting the first speed pattern;
determining a second number of vehicles associated with the received probe data fitting the second speed pattern;
comparing the first number of vehicles fitting the first speed pattern with the second number of vehicles fitting the second speed pattern;
determining, based on the comparison of the first number of vehicles with the second number of vehicles, the smaller of the first number and the second number;
wherein the received probe data associated with the smaller of the first number and the second number is stored in the carpool lanes database; and
wherein the remaining received probe data is stored in the regular lanes database.

10. The method according to claim 9, further comprising:
matching the received probe data to a plurality of road links included in a map database in communication with the remote server;
assigning link identifiers to the matched probe data identifying specific road links contained in the map database; and
wherein the received probe data stored in the carpool lanes database and/or the regular lanes database includes the link identifiers.

11. The method according to claim 10, wherein the step of matching the received probe data includes a step of identifying a carpool lane link.

12. The method according to claim 9, further comprising:
receiving traffic information from a traffic database in communication with the remote server; and
comparing the received probe data to the traffic information.

13. The method according to claim 12, wherein the traffic database is a real-time traffic database.

14. The method according to claim 12, wherein the traffic database is an historical traffic database.

15. The method according to claim 9, wherein the steps of determining the first number of vehicles and determining the second number of vehicles are performed for a substantially similar time interval.

16. The method according to claim 9, wherein the first speed pattern is determined based on a first average speed value of the plurality of probe vehicles associated with a first road link obtained at a particular time; and
wherein the second speed pattern is determined based on a second average speed value of the plurality of probe vehicles associated with a second road link at a particular time.

17. A method for sorting traffic data from a plurality of vehicles with a navigation system at a remote server; comprising:
receiving traffic data from a plurality of vehicles at the remote server;
determining whether the received traffic data corresponds to at least two speed patterns;
calculating a first number of vehicles associated with a first speed pattern;
calculating a second number of vehicles associated with a second speed pattern;
comparing the first number of vehicles associated with the first speed pattern with the second number of vehicles associated with the second speed pattern;
determining, based on the comparison of the first number of vehicles with the second number of vehicles, the smaller of the first number and the second number and the larger of the first number and the second number;
storing a first portion of the received traffic data associated with the larger of the first number of vehicles and the second number of vehicles in a regular lanes database; and
storing a second portion of the received traffic data associated with the smaller of the first number of vehicles and the second number of vehicles in a carpool lanes database.

18. The method according to claim 17, further comprising:
matching the received traffic data to a plurality of road links included in a map database in communication with the remote server;
assigning link identifiers to the matched traffic data identifying specific road links contained in the map database; and
wherein each of the first portion of the received traffic data and the second portion of the received traffic data includes the link identifiers.

19. The method according to claim 18, wherein the step of matching the received traffic data includes a step of identifying a carpool lane link.

20. The method according to claim 17, further comprising:
receiving traffic information from a traffic database in communication with the remote server; and
comparing the received traffic data to the traffic information.

21. The method according to claim 20, wherein the traffic database is at least one of a real-time traffic database and an historical traffic database.

22. The method according to claim 17, wherein the step of comparing the first number of vehicles and the second number of vehicles is performed for a set time interval.

23. The method according to claim 17, wherein the at least two speed patterns are each determined based on an average speed value of the plurality of vehicles associated with a particular roadway, road link, and/or travel lane at a particular time.

* * * * *